(12) United States Patent
Sidon et al.

(10) Patent No.: US 11,641,801 B2
(45) Date of Patent: May 9, 2023

(54) AGRICULTURAL HARVESTING MACHINE CONTROL USING MACHINE LEARNING FOR VARIABLE DELAYS

(71) Applicant: Deere & Company, Moline, IL (US)

(72) Inventors: Jeffrey S. Sidon, Des Moines, IA (US); Matthew E. Poush, Des Moines, IA (US); Michael J. Davis, San Francisco, CA (US)

(73) Assignee: Deere & Company, Moline, IL (US)

( * ) Notice: Subject to any disclaimer, the term of this patent is extended or adjusted under 35 U.S.C. 154(b) by 388 days.

(21) Appl. No.: 16/897,705

(22) Filed: Jun. 10, 2020

(65) Prior Publication Data

US 2021/0321567 A1 Oct. 21, 2021

Related U.S. Application Data

(60) Provisional application No. 63/013,046, filed on Apr. 21, 2020.

(51) Int. Cl.
*A01D 41/127* (2006.01)
*G06N 20/00* (2019.01)

(52) U.S. Cl.
CPC ......... *A01D 41/1271* (2013.01); *G06N 20/00* (2019.01)

(58) Field of Classification Search
CPC ... A01D 41/1271; G06N 20/00; A01B 79/005
See application file for complete search history.

(56) References Cited

U.S. PATENT DOCUMENTS

| | | | |
|---|---|---|---|
| 9,652,691 B2* | 5/2017 | Scharf | G06T 7/90 |
| 9,686,913 B2* | 6/2017 | Foster | A01D 46/084 |
| 9,903,979 B2 | 2/2018 | Dybro et al. | |
| 9,953,241 B2* | 4/2018 | Lobell | G06V 20/13 |
| 10,126,282 B2 | 11/2018 | Anderson et al. | |
| 10,188,037 B2* | 1/2019 | Bruns | A01D 41/1273 |

(Continued)

FOREIGN PATENT DOCUMENTS

| | | |
|---|---|---|
| CN | 105741180 A | 7/2016 |
| JP | 2004024055 A | 1/2004 |

OTHER PUBLICATIONS

Extended European Search Report and Written Opinion issued in European Patent Application No. 21162367.3, dated Aug. 16, 2021, in 09 pages.

*Primary Examiner* — Manuel A Rivera Vargas
*Assistant Examiner* — Yaritza H Perez Bermudez
(74) *Attorney, Agent, or Firm* — Christopher J. Volkmann; Kelly, Holt & Christenson, PLLC

(57) ABSTRACT

A computer-implemented method includes obtaining field data for a field that was generated prior to an agricultural harvesting machine operating on the field, the field data representing an estimated yield, obtaining yield data, that is georeferenced to the field, based on a signal from a yield sensor on the agricultural harvesting machine, applying a flow model to the yield data to generate a yield map, the flow model having a set of parameters that models material flow through a harvesting system of the agricultural harvesting machine, obtaining an adjusted set of parameters based on a correlation between the yield map and the estimated yield, modifying the yield map based on the adjusted set of parameters, and generating a control signal based on the modified yield map.

17 Claims, 16 Drawing Sheets

(56) References Cited

U.S. PATENT DOCUMENTS

| | | |
|---|---|---|
| 10,295,703 B2 | 5/2019 | Dybro et al. |
| 10,660,268 B2 * | 5/2020 | Dybro .................... A01F 12/44 |
| 10,729,067 B2 * | 8/2020 | Hammer ............... G01L 9/0005 |
| 11,178,818 B2 * | 11/2021 | Brammeier ........ A01D 41/1275 |
| 11,240,961 B2 * | 2/2022 | Anderson ............ A01D 41/127 |
| 2016/0084813 A1 * | 3/2016 | Anderson ............ G01N 33/025 |
| | | 702/5 |
| 2017/0089742 A1 * | 3/2017 | Bruns ................ A01D 41/1273 |
| 2018/0120133 A1 * | 5/2018 | Blank .................. G01D 18/002 |
| 2018/0122020 A1 | 5/2018 | Blank et al. |
| 2018/0164471 A1 * | 6/2018 | Dybro ....................... G01P 3/00 |
| 2018/0257657 A1 * | 9/2018 | Blank ................... B60W 10/20 |
| 2020/0337235 A1 * | 10/2020 | Blank ................. A01M 21/043 |

* cited by examiner

US 11,641,801 B2

AGRICULTURAL HARVESTING MACHINE CONTROL USING MACHINE LEARNING FOR VARIABLE DELAYS

CROSS-REFERENCE TO RELATED APPLICATION

The present application is based on and claims the benefit of U.S. provisional patent application Ser. No. 63/013,046, filed Apr. 21, 2020, the content of which is hereby incorporated by reference in its entirety.

FIELD OF THE DESCRIPTION

The present description generally relates to agricultural harvesting machines. More specifically, but not by limitation, the present description relates to control of an agricultural harvesting machine using machine learning for variable harvesting system delays.

BACKGROUND

There are a wide variety of different types of mobile work machines. Those machines can include agricultural machines, as well as construction machines, turf management machines, forestry machines, etc.

Some current systems have attempted to use a priori data to generate a predictive model that can be used to control the work machines. For instance, agricultural harvesters can include combine harvesters, forage harvesters, cotton harvesters, among others. Some current systems for such agricultural harvesting machines have attempted to use a priori data (such as aerial imagery of a field) in order to generate yield estimations. For instance, a yield map can identify yields at different geographic locations in the field and can be used for a wide variety of reasons. For instance, a yield map can be used to control the harvesting machine, or other machines operating during the harvesting season, as well as other operations such as field preparation and/or planting in subsequent seasons. Also, the yield map can provide indications of estimated crop harvesting quantities that may be useful to the harvester operator, another farmer, a farm manager, a fleet manager, etc.

The discussion above is merely provided for general background information and is not intended to be used as an aid in determining the scope of the claimed subject matter.

SUMMARY

A computer-implemented method includes obtaining field data for a field that was generated prior to an agricultural harvesting machine operating on the field, the field data representing an estimated yield, obtaining yield data, that is georeferenced to the field, based on a signal from a yield sensor on the agricultural harvesting machine, applying a flow model to the yield data to generate a yield map, the flow model having a set of parameters that models material flow through a harvesting system of the agricultural harvesting machine, obtaining an adjusted set of parameters based on a correlation between the yield map and the estimated yield, modifying the yield map based on the adjusted set of parameters, and generating a control signal based on the modified yield map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6-1 and 6-2 (collectively referred to as FIG. 6) include a flow diagram for generating a yield map using machine learning for variable delays, in one example.

DETAILED DESCRIPTION

As discussed above, some current systems attempt to use a priori data (such as aerial images) in order to generate a predictive map that can be used to control an agricultural harvesting machine, or other type of work machine. By way of example, there has been a great deal of work done in attempting to generate agricultural yield maps for a field, based upon vegetation index values generated from aerial imagery. Such yield maps attempt to estimate yield at different locations within the field. A yield map generation system can utilize in situ or ground-truthed data as part of yield map generation. For instance, yield sensor(s) or monitor(s) on a harvesting machine can detect instantaneous aggregate yield as material passes the sensor(s) within the harvesting machine.

In order to accurately distribute the instantaneous aggregate yield, at the sensor location) to the corresponding field locations from which the material was harvested, a system can identify delays from the time the crop (e.g., grain) enters the header to when it is measured by the yield sensor. However, these delays can vary based on machine and/or field conditions (and/or other factors), and can change as performance of the harvesting machine varies over time (e.g., wear and tear on the harvesting system, etc.).

Some systems attempt to smooth two-dimensional yield map by performing a blurring process. That is, a two-dimensional yield map can be blurred or smoothed across one variable, that being yield. However, the final smoothed map may not accurately reflect the actual yield distribution.

The present description describes a processing and control system for an agricultural harvesting machine that generates maps or other models with enhanced yield estimation by using machine learning for variable delays in the harvesting machine. As mentioned above, delays in a harvesting machine can change based on such factors as tilt or pose of the machine on the field (e.g., changes to the field pitch or slope), the amount of material entering the harvesting machine, crop moisture, crop variety, or any other of a variety of reasons. The present system utilizes machine learning to identify a set of flow model parameters that reflect the instantaneous delays of the machine, even as they change during the harvesting operation.

Figure 1:
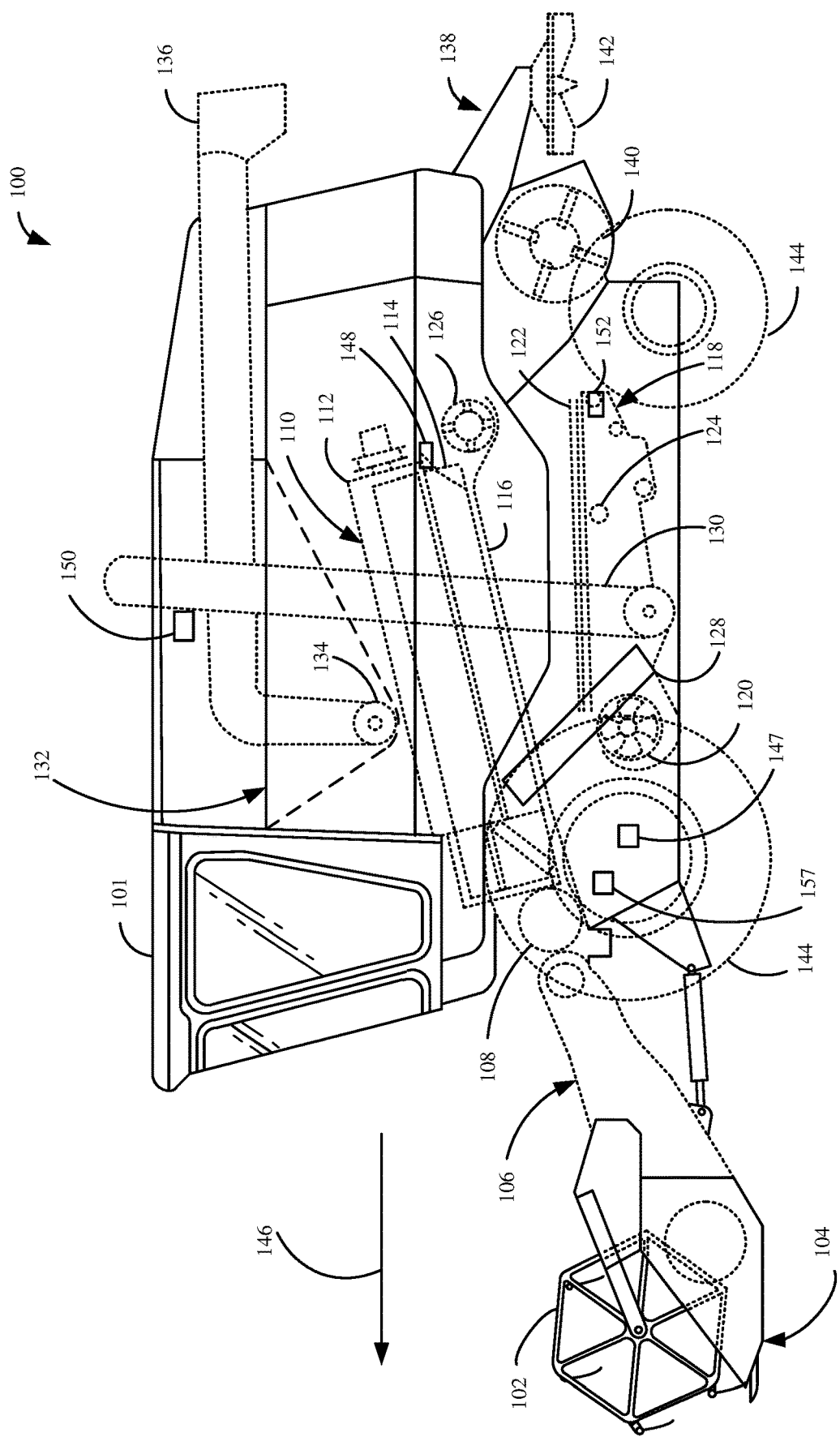
FIG. 1 is a partial schematic, partial pictorial illustration of an agricultural harvesting machine, in one example.

FIG. 1 is a partial pictorial, partial schematic, illustration of one example of an agricultural harvesting machine 100 (also referred to as a harvester or combine). It is noted that while examples are discussed herein in the context of a harvesting machine, the described model generation and machine learning can be useful in other types of work machines.

It can be seen in FIG. 1 that machine 100 illustratively includes an operator compartment 101, which can have a variety of different operator interface mechanisms, for controlling machine 100, as will be discussed in more detail below. Machine 100 can include a set of front-end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, machine 100 can include a separator 116 that includes a separator rotor. Machine 100 can include a cleaning subsystem (or cleaning shoe) 118 that, itself, can include a cleaning fan 120, chaffer 122 and sieve 124. The material handling subsystem in machine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Machine 100 can further include a residue subsystem 138 that can include chopper 140 and spreader 142. Machine 100 can also have a propulsion subsystem that includes an engine (or other power source) that drives ground engaging wheels 144 or tracks, etc. It will be noted that machine 100 may also have more than one of any of the subsystems mentioned above (such as left and right cleaning shoes, separators, etc.).

In operation, and by way of overview, machine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in machine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, machine 100 can include ground speed sensor 147, one or more separator loss sensors 148, a clean grain camera 150, and one or more cleaning shoe loss sensors 152. Ground speed sensor 147 illustratively senses the travel speed of machine 100 over the ground. This can be done by sensing the speed of rotation of the wheels, the drive shaft, the axel, or other components. The travel speed and position of machine 100 can also be sensed by a positioning sensor 157, such as using a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on machine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through machine 100. They can include machine setting sensors that are configured to sense the various configurable settings on machine 100. They can also include a machine orientation sensor that can be any of a wide variety of different types of sensors that sense the orientation or pose of machine 100. Crop property sensors can sense a variety of different types of crop properties, such as crop type, crop moisture, and other crop properties. They can also be configured to sense characteristics of the crop as they are being processed by machine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

Figure 2:
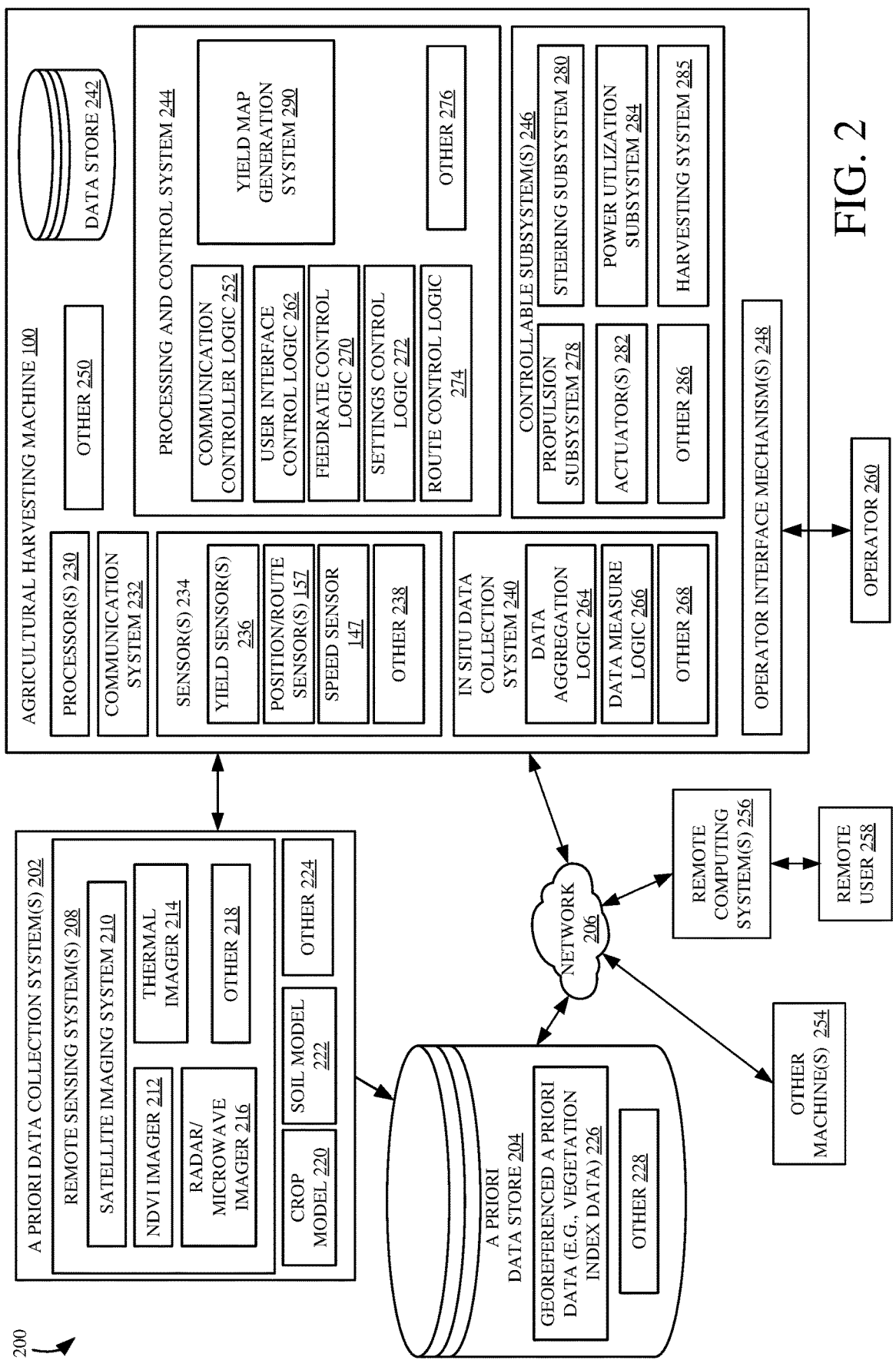
FIG. 2 is a block diagram showing one example of a computing system architecture that includes the agricultural harvesting machine shown in FIG. 1.

FIG. 2 is a block diagram showing one example of a computing system architecture 200 that includes agricultural harvesting machine 100, an a priori data collection system(s) 202, and an a priori data store 204 which is connected to machine 100 by network 206. Some items shown in FIG. 2 are similar to those shown in FIG. 1, and they are similarly numbered.

Network 206 can be any of a wide variety of different types of networks including, but not limited to, a wide area network, such as the Internet, a cellular communication network, a local area network, a near field communication network, or any of a wide variety of other networks or combinations of networks or communication systems.

A priori data collection system (or systems) 202 illustratively collects a priori data corresponding to a target or subject field, that can be used by machine 100 to generate a model (such as a yield map of the field) that can be used to control machine 100. This is discussed in further detail below. Briefly, by a priori, it is meant that the data for the target worksite or portion of the worksite, is formed or obtained beforehand, prior to operation by machine 100 on that worksite. In the context of agricultural field, example a prior data represents crop characteristics (such as normalized difference vegetation index (NDVI) data) corresponding to a portion of the field that is generated prior to machine 100 operating on that portion of the field. The data generated by system 202 can be sent to machine 100 directly and/or stored in data store 204.

In one example, system 202 can include remote sensing system(s) 208 that are configured to remotely sense a target or subject field under consideration. Examples of a system 208 include, but are not limited to, satellite imaging system 210, an NDVI imager 212, a thermal imager 214, a radar/microwave imager 216, or other types of remote sensing systems (represented by block 218). System 208 can also include crop model data 220, soil model data 222, etc., and can include a wide variety of other items 224 as well.

NDVI imager 212 can include, but is not limited to, aerial imaging systems (e.g., satellite systems, manned or unmanned aerial vehicle imaging systems, etc.) that can be used to take images from which NDVI values can be generated. Thermal imager 214 illustratively includes one or more thermal imaging sensors that generate thermal data. Radar/microwave imager 216 illustratively generates radar or microwave images. Crop model 220 can be used to generate data which is predictive of certain characteristics of the crop, such as yield, moisture, etc. Soil model 222 is illustratively a predictive model that generates characteristics of soil at different locations in a field. Such characteristics can include soil moisture, soil compaction, soil quality or content, etc.

All of these systems 202 can be used to generate data indicative of metric values, or from which metric values can be derived, and used in controlling machine 100. They can be deployed on remote sensing systems, such as unmanned aerial vehicles, manned aircraft, satellites, etc. The data generated by systems 202 can include a wide variety of other things as well, such as weather data, soil type data, topographic data, human-generated maps based on historical information, and a wide variety of other systems for generating data corresponding to the worksite on which machine 100 is currently deployed.

A priori data store 204 thus includes georeferenced a priori data 226, and it can include other items 228 as well. Data 226 can be, for example, vegetation index data which includes vegetation index values that are georeferenced to the target field being harvested. The vegetation index data may include such things as NDVI data, leaf area index data, soil adjusted vegetation index (SAVI) data, modified or optimized SAVI data, simple ratio or modified simple ratio data, renormalized difference vegetation index data, chlorophyll/pigment related indices (CARI), modified or transformed CARI, triangular vegetation index data, structural insensitive pigment index data, normalized pigment chlorophyll index data, photochemical reflectance index data, red edge indices, derivative analysis indices, among a wide variety of others, some are shown in FIG. 3.

Figure 3:
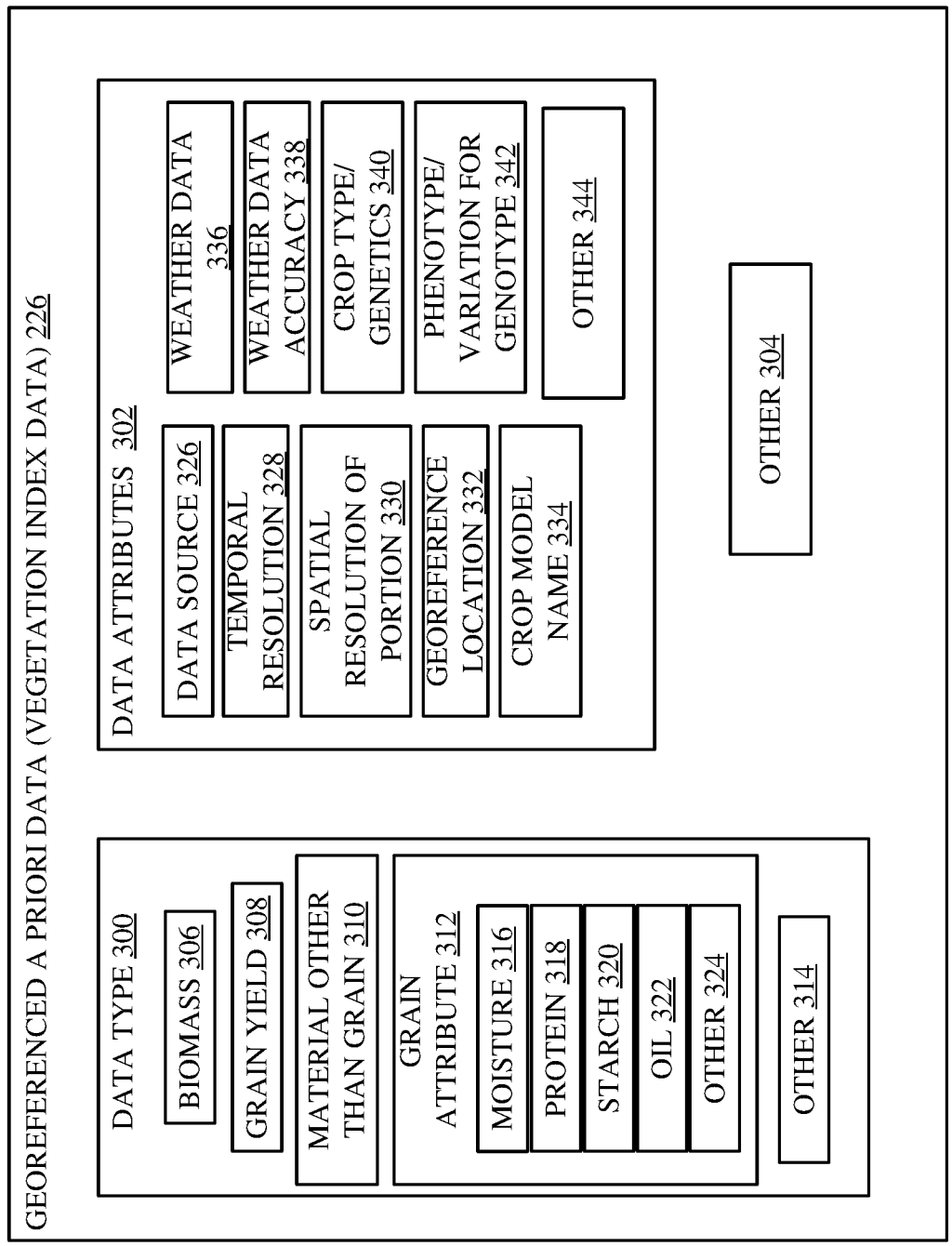
FIG. 3 is a block diagram showing an example set of georeferenced a priori data.

FIG. 3 is a block diagram showing one example set of georeferenced a priori data 226. Illustratively, data 226 includes data types 300 and data attributes 302 and can include other items as well, as indicated by block 304. Data types 300 can be of one or more of the following, without limitation, crop biomass 306, crop grain yield 308, material other than grain (MOG) 310, grain attributes 312 and can include other items as well, as indicated by block 314.

Crop biomass 306 can be indicative of the predicted amount of biomass in the given section of the field. For example, biomass may be indicated as a mass unit (kg) over an area unit ($m^2$). Crop grain yield 308 can be indicative of the predicted amount of yield in the given section of the field. For example, crop grain yield may be indicated as a yield unit (bushel) over an area unit (acre).

Grain attributes 312 can include a variety of different attributes. As indicated by block 316, the grain moisture can be estimated. As indicated by block 318, the grain protein can be estimated. As indicated by block 320, the grain starch can be predicted. As indicated by block 322, the grain oil can be predicted. Of course, these are only examples and other crop attributes may also be sensed, estimated or predicted, as indicated by block 324.

Data attributes 302 can include a variety of different attributes some of which are applicable for one set of a priori data and not another. An attribute data source 326 indicates the source of data to make the prediction. For example, data source 326 is indicative of one or more of a priori data collection systems 202. Data source 326 can also indicates the date that the data was sensed. The attribute temporal resolution 328 indicates the amount of time that the data was gathered over (e.g., a single image would have a minimal temporal resolution). The attribute spatial resolution 330 indicates the spatial resolution sensed, that is the minimal unit of area that the given sensor can sense accurately. The geospatial location 332 is indicative of the location being sensed. An identifier 334 is indicative of a name or number of the crop model that can be utilized as an identifier of the crop model. Weather data 336 is indicative of the weather at the time of the sensing. Weather data accuracy 338 is indicative of the accuracy of the given weather data. Crop type 340 is indicative of the type of crop sensed. Phenotype variation 342 is indicative of the phenotype variation for the genotype of the given crop. Data attributes 302 can include other items as well, as indicated by block 344.

Referring again to FIG. 2, machine 100 can include one or more different processors 230, communication system 232, sensor(s) 234 (which can include yield sensor(s) 236, position/route sensors 157, speed sensors 147, and a wide variety of other sensors 238, which can be those described above with respect to FIG. 1 or different ones), in situ data collection system 240, data store 242, processing and control system 244, controllable subsystems 246, operator interface mechanisms 248, and it can include a wide variety of other items 250.

Position sensor(s) 157 are configured to determine a geographic position of machine 100 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 147 are configured to determine a speed at which machine 100 is traveling the field.

Control system 244 includes communication controller logic 252 configured to control communication system 232 to communicate between components of machine 100 and/or with other machines or systems in architecture 200, such as system(s) 202, data store 204, other machine(s) 254, and/or a remote computing system 256, either directly or over a network 206.

A remote user 258 is illustrated interacting with remote computing system 256. Remote computing system 256 can be a wide variety of different types of systems. For example, remote computing system 256 can be a remote server environment, remote computing system that is used by remote user 258. Further, it can be a remote computing system, such as a mobile device, remote network, or a wide variety of other remote systems. System 256 can include one or more processors or servers, a data store, and it can include other items as well.

Communication system 232 can include wired and/or wireless communication logic, which can be substantially any communication system that can be used by the systems and components of machine 100 to communicate information to other items, such as between control system 244, sensor(s) 234, and controllable subsystem(s) 246. In one example, communication system 232 communicates over a controller area network (CAN) bus (or another network, such as an Ethernet network, etc.) to communicate information between those items. This information can include the various sensor signals and output signals generated by the sensor variables and/or sensed variables.

An operator 260 can interact with operator interface mechanisms 248 in order to control and manipulate machine 100. Operator interface mechanism(s) 248 can be controlled by user interface control logic 262, and can include such things as a steering wheel, pedals, levers, joysticks, buttons, switches, dials, linkages, etc. In addition, they can include a display device that displays user actuatable elements, such as icons, links, buttons, etc. Where the display is a touch sensitive display, those user actuatable items can be actuated by touch gestures, and can include virtual mechanisms or actuators such as a virtual keyboard or actuators displayed on a touch sensitive screen. Similarly, where mechanisms 248 include speech processing mechanisms, then operator 260 can provide inputs and receive outputs through a microphone and speaker, respectively. Operator interface mechanisms 248 can include any of a wide variety of other audio, visual or haptic mechanisms.

In situ data collection system 240 illustratively includes data aggregation logic 264, data measure logic 266, and it can include other items 267. System 240 is configured to obtain in situ field data that represents actual values being modeled. For instance, a yield map can be dynamically generated based upon a priori data (such as aerial imagery data) and in situ data, such as actual yield data sensed on the machine (e.g., using sensor(s) 236 during the harvesting operation.

Control system 244 can include feed rate control logic 270, settings control logic 272, route control logic 274, and it can include other items 276. Controllable subsystems 246 illustratively includes propulsion subsystem 278, steering subsystem 280, one or more different actuators 282 (e.g., used to change machine settings, machine configuration, etc.), power utilization subsystem 284, harvesting system 285 (which can include one or more of actuator(s) 282), and it can include a wide variety of other systems 286, some of which were described above with respect to FIG. 1. Harvesting system 285 includes crop processing functionality of machine 100, such as header 102, feeder house 106, feed accelerator 108, thresher 110, cleaning subsystem 118, residue subsystem 138.

Feed rate control logic 270 illustratively controls propulsion system 278, harvesting system 285, and/or any other controllable subsystems 246 to maintain a relatively constant feed rate, e.g., based upon the yield for the geographic location that machine 100 is about to encounter, or other predicted, estimated, or sensed characteristics. Similarly, settings control logic 272 can control actuators 282 in order to change machine settings based upon a predicted characteristic of the field being harvested (e.g., based upon a predicted yield, or other predicted characteristic). By way of example, settings control logic 272 may actuate actuators 282 that change the concave clearance on a combine, based upon the predicted yield or biomass to be encountered by the machine.

Control system 244 includes a yield map generation system 290 configured to generate a yield map that can be utilized in control of architecture 200. For instance, the yield map can be utilized to control agricultural machine 100, and/or can be sent to other machines or systems such as machine(s) 254 and system(s) 256. This, of course, if by way of example only.

Figure 4:
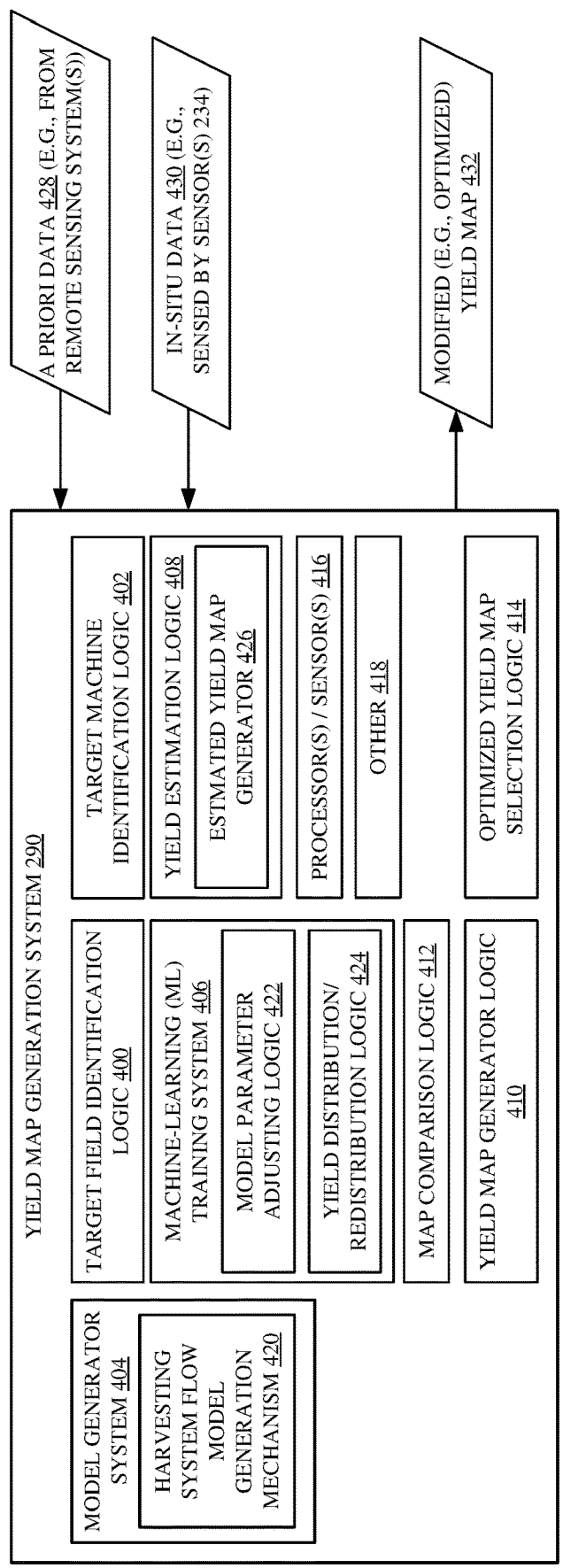
FIG. 4 is a block diagram showing one example of a yield map generation system.

FIG. 4 illustrates one example of yield map generation system 290. System 290 includes target field identification logic 400, target machine identification logic 402, a model generator system 404, a machine-learning (ML) training system 406, yield estimation logic 408, yield map generator logic 410, map comparison logic 412, and optimized yield map selection logic 414. System 290 is also illustrated as having one or more processors or servers 416, and can include other items 418 as well.

Logic 400 is configured to identify a target or subject field under consideration, to be harvested by machine 100. Logic 402 is configured to identify the particular machine that is to perform the operation. The identifications performed by logic 400 and/or 402 can be automatic, for example based on detected position of machine 100 and/or user input.

Model generator system 404 includes a harvesting system flow model generation mechanism 420 configured to generate, or otherwise obtain, a harvesting system flow model. The flow model includes a set of parameters for harvesting system 285 of machine 100 that represent instantaneous lateral and transverse delays of the crop flow through system 285.

In some situations, parameters of a flow model can be measured directly, by sensing operation of machine 100. However, in other instances, the parameters of the flow model are not easily, if at all, identifiable. System 406 is configured to utilize machine learning to find a set of parameters (e.g., a set of modeled lateral and transverse delays) that result in minimum variance (or at least a variance below a threshold) between a yield estimation and a baseline measured yield, that is measured based on sensed data during operation of machine 100. This can include identifying a maximum or optimal correlation between an a priori yield estimate and the measured yield.

Figure 5:
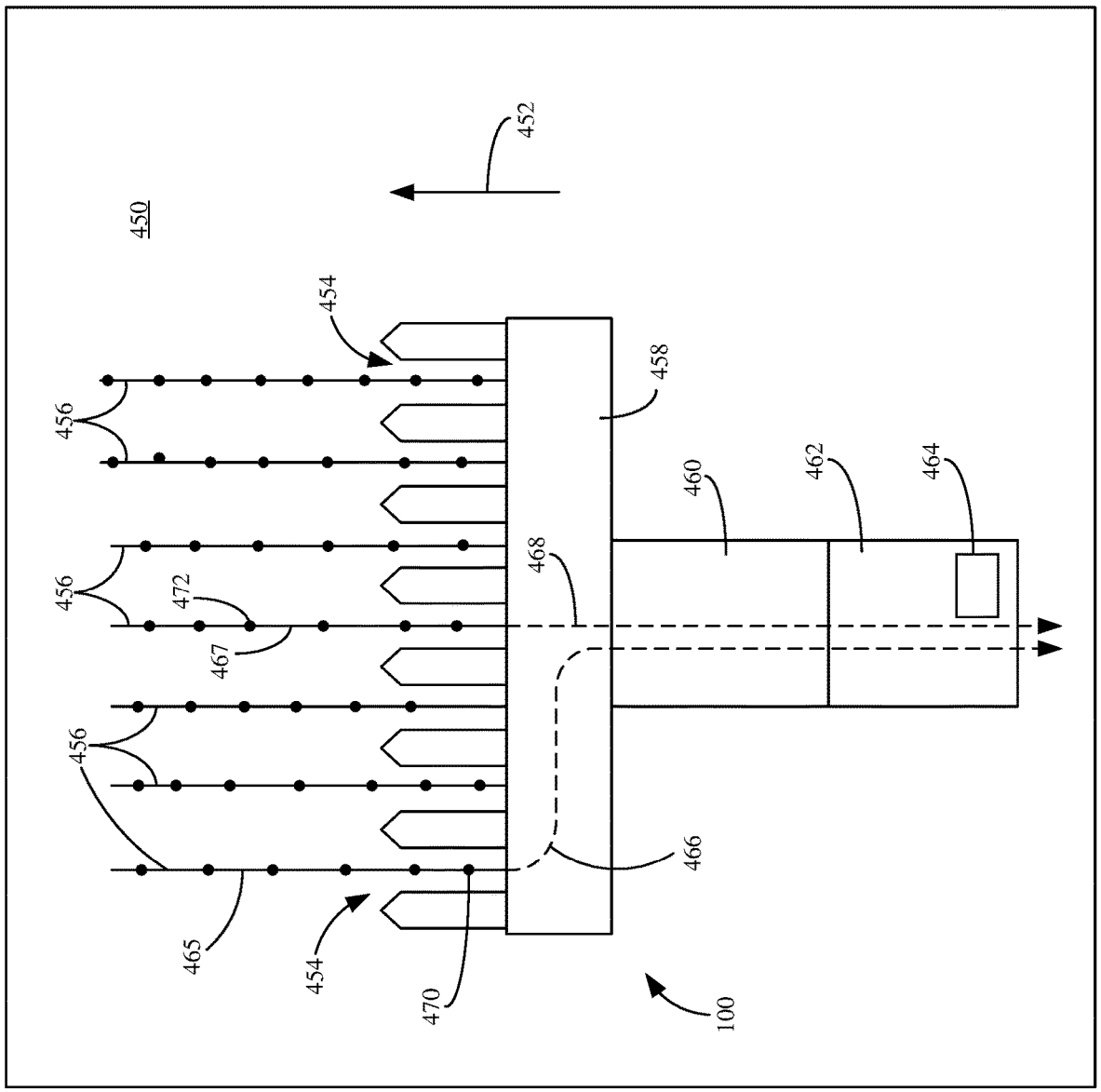
FIG. 5 is a schematic illustration of an agricultural harvesting machine as the machine traverses a field, during an example harvesting operation.

Before discussing system 290 in further detail, an example of lateral and transverse delays will be discussed with respect to FIG. 5. FIG. 5 is a schematic illustration of machine 100 as it traverses a field 450, in a direction of travel 452, during a harvesting operation. Illustratively, machine 100 includes a plurality of row units 454 configured to engage and cut crop (corn plants in the present example), arranged in a plurality of rows. Individual corn plants are represented by the dots arranged along rows 456 (represented by the lines in FIG. 5). As the header 458 engages and cuts the corn plants, the material is conveyed through a feeder house 460 and through other crop processing functionality 462 of the harvesting system 285 (e.g., threshing section, etc.). One or more yield sensors or monitors 464 are arranged along a path of conveyance and configured to detect an instantaneous yield, which can be georeferenced to the location of machine 100 on field 450 when sensor(s) 464 detected the yield.

Due to the configuration of the row units 454 on header 458, the crop material from different rows experience different delays (different travel times) from different portions of header 458 to the sensor(s) 464. Illustratively, the aggregated yield measured by sensor 464 at a particular time, for a particular measurement interval, is the result of the aggregation of crop harvested from geo-referenced regions in the pattern or shape of a chevron, a line or strip in the shape of a V or an inverted V, depending on orientation.

In the illustrated example, the material flow path from a first row 465 is represented by dashed line 466 and the material flow path from a second row 467 is represented by dashed line 468. Accordingly, material from first row 465 experiences a longer time delay to reach sensor(s) 464 than the material from the more centrally located row 467. In other words, the material from a first crop plant 470 in row 465 and from a second crop plant 472 in row 467 reach yield sensor 464 at the same time (and both contribute to the instantaneous aggregate yield at given time and field location), even though crop plants 470 and 472 were not cut by header 458 at the same time (i.e., that are not aligned laterally across the direction of travel 452). Using the flow model that models the delays of harvesting system 285, the aggregate yield sensed by sensor(s) 464 can be distributed or allocated to the locations of the field corresponding to plants 470 and 472, to generate the actual yield map.

The delays of the harvesting system can be initialized prior to operation of machine 100 and/or they can be detected based on sensing the configuration, settings, and/or operation of machine 100, or otherwise. However, as noted above, in many operational scenarios the model parameters can be based on specific configurations of a piece of equipment, and can vary based on changes to the field conditions (e.g., slope changes, crop moisture changes, etc.), and can be influenced by variation and wear of system 285 over time.

For sake of illustration, assume that machine 100 is harvesting an area of a field with of a field having a hill with relatively constant yield. As machine 100 makes a pass in a downhill direction, yield sensor 464 detect a higher instantaneous yield than when machine makes a subsequent pass going uphill in the opposite direction. That is, the pitch of the machine as it is going down the hill results in different flow characteristics than when the machine is pitched up the hill. Thus, model parameters for distributing the yield in the area of the field in which the machine is traversing down the hill will not provide an accurate yield distribution if used when the machine is operating going up the hill.

System 290 is configured to identify changes in the system flow model and identify a yield map by redistributing yield values using a correlation of a priori data, such as data from a remote sensing system, to the actual measured yield. This can account for dynamically changing operational characteristics, and thereby facilitate an improved yield map.

Referring again to FIG. 4, training system 406 includes model parameter adjusting logic 422 configured to adjust parameters of the harvesting system flow model. System 406 also includes yield distribution/redistribution logic 424 that is configured to distribute, or redistribute, the detected yield to corresponding locations on the field based on the model parameters.

Yield estimation logic 408 includes an estimated yield map generator 426 configured to generate, or otherwise obtain, an estimated yield map. In the illustrated example, the estimated yield map is based on a priori data 428 received by system 290. Data 428, in one example, is generated by and/or received from remote sensing systems 208, illustrated in FIG. 2. Accordingly, the a priori data 428 can be generated from a wide variety of different types of sources, such as from satellite or aerial images, thermal images, etc. In one example, a priori data 428 includes, or represents a vegetative index, such as NDVI discussed above.

Yield map generator logic 410 is configured to generate georeferenced yield data (a current yield map) based on in situ data 430. For example, in situ data can include data sensed by sensor(s) 234. For instance, in situ data 430 includes instantaneous yield data, aggregated across the machine header, sensed by yield sensor 236. The yield data, in one example, is distributed by logic 424 using current model parameters that model the delays from the flow model.

Map comparison logic 412 is configured to compare the yield map generated by logic 410 and the estimated yield generated by logic 408, based on a priori data 428. The model parameters of the harvesting system flow model can be adjusted by block 422 until a threshold correlation is achieved between the generated yield map and the estimated yield. In response to this, logic 414 can select the yield map which is output at block 432.

Figures 1, 6:
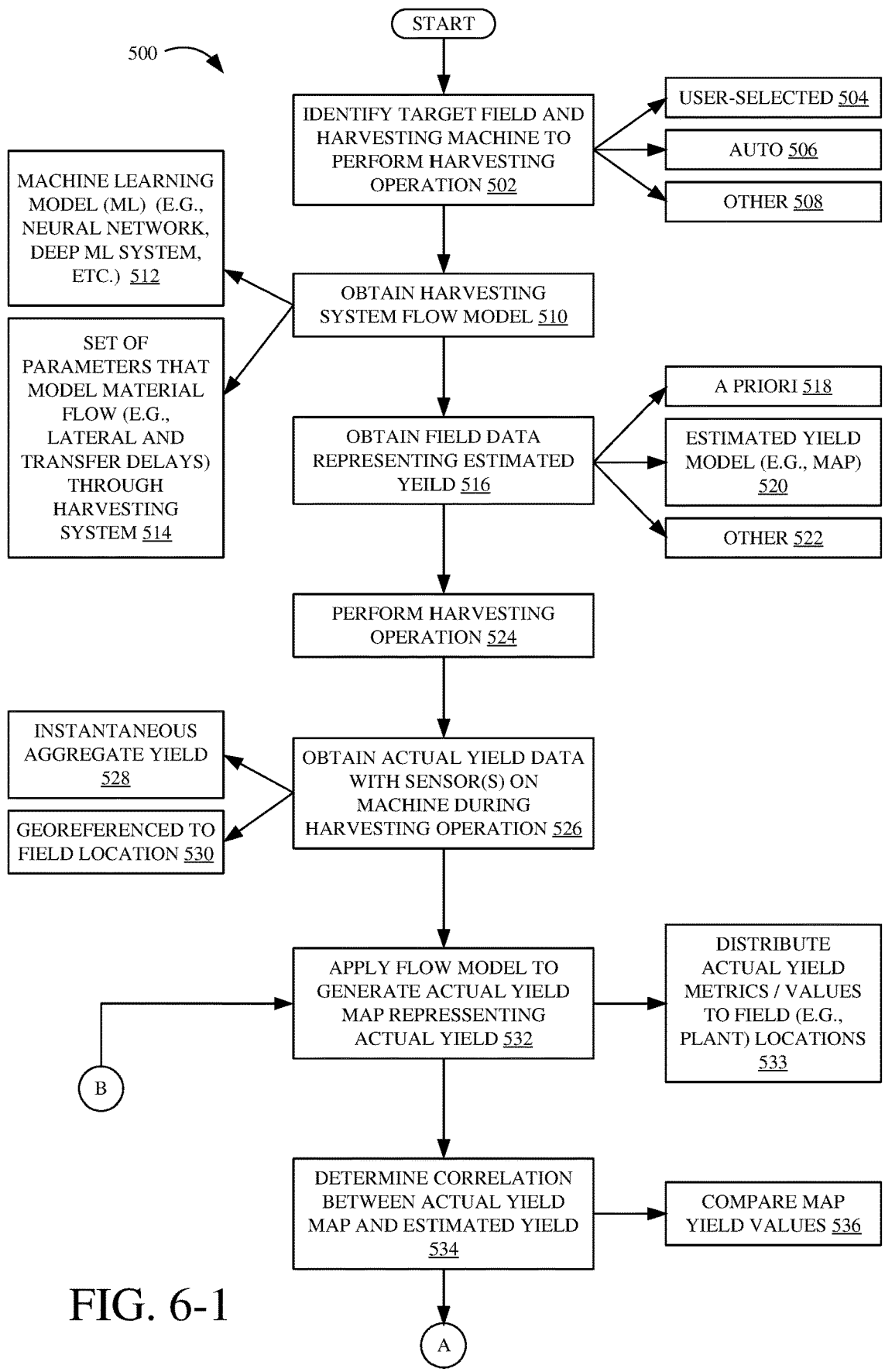
Figures 2, 6:
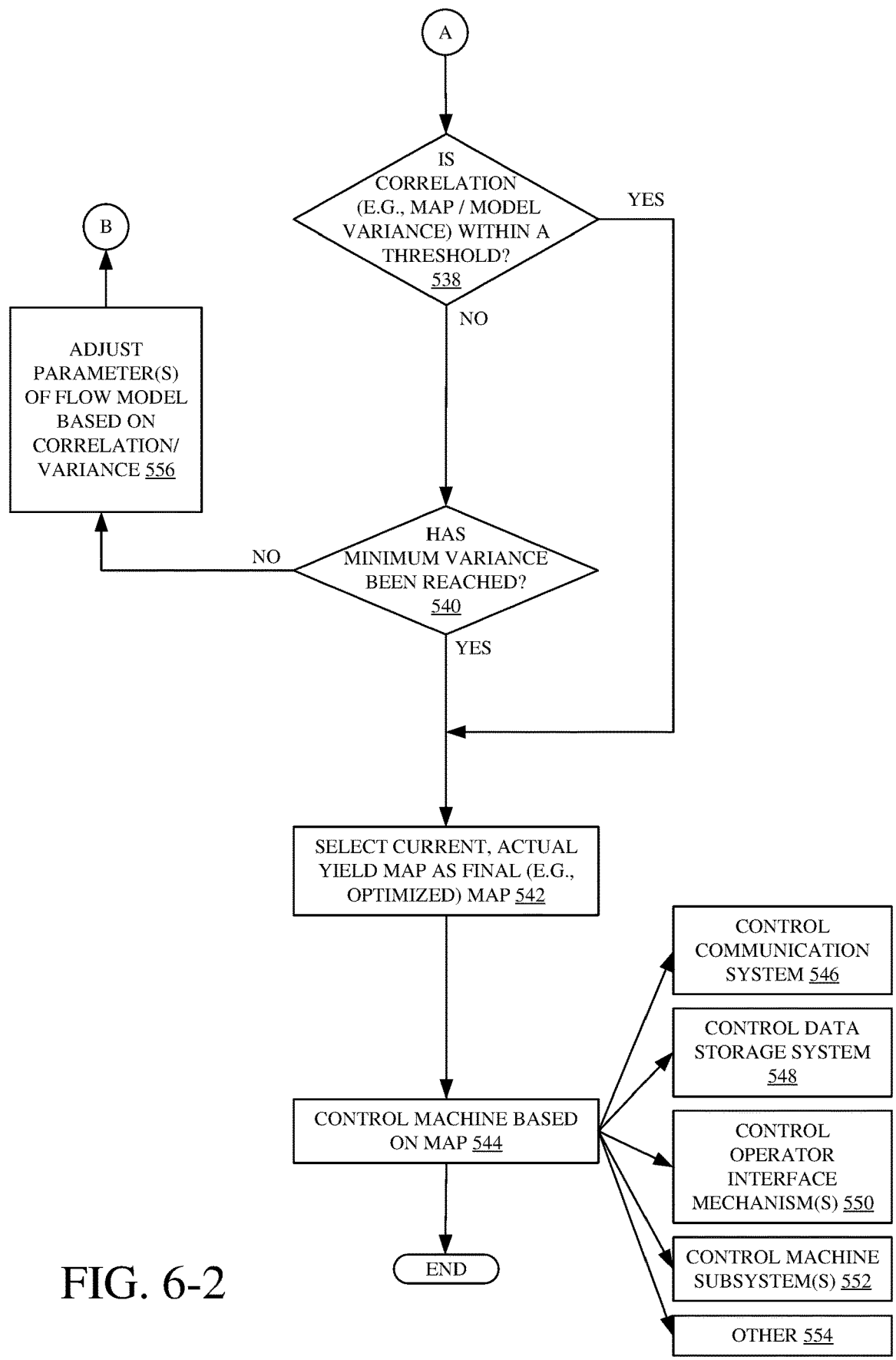

FIGS. 6-1 and 6-2 (collectively referred to as FIG. 6) include a flow diagram 500 for generating a yield map using machine learning for variable delays. For sake of illustration, but not by limitation, FIG. 6 will be described in the context of system 290 generating a yield map for operation of machine 100 on field 450, illustrated in FIG. 5. At block 502, the target field and/or harvesting machine to perform the harvesting operation are identified. The target field and harvesting machine cannot be identified based on user selection (block 504) automatically (block 506), or otherwise (block 508). For example, field 450 and machine 100 can be identified based on a detected location of machine 100 using position sensor 157.

At block 510, a harvesting system flow model is obtained. The harvesting system flow model is, in one example, pre-generated and based on the particular make or manufacturer, model, or other characteristics of machine 100. In one example, the harvesting system flow model includes a machine learning (ML) model for harvesting system 285. This is represented at block 512. The model includes machine learning algorithm(s), such as, but not limited to, memory networks, Bayes systems, decision trees, Eigenvectors, Eigenvalues and Machine Learning, Evolutionary and Genetic Algorithms, Expert Systems/Rules Engines/Symbolic Reasoning, Generative Adversarial Networks (GANs), Graph Analytics and ML, Linear Regression, Logistic Regression, LSTMs and Recurrent Neural Networks (RNNs), Convolutional Neural Networks (CNNs), MCMC, Random Forests, Reinforcement Learning or Reward-based machine learning (ML), and the like.

The harvesting system flow model includes a set of parameters that model material flow (e.g., lateral and transverse delays) through harvesting system 285. This is represented at block 514. At block 516, field data representing estimated yield is obtained. For example, this can include a priori data (e.g., data 428 shown in FIG. 4). This is represented at block 518. For example, the field data obtained at block 516 can include remote sensing imagery or other data. Alternatively, or in addition, the data can include vegetative index data, such as NDVI.

As illustrated at block 520, the field data can comprise an estimated yield model, such as an estimated yield map. This estimated yield model or map can be received by system 290, or can be generated by system 290 based on received data. Of course, other field data can be obtained as well. This is represented at block 522.

At block 524, machine 100 is controlled to perform the harvesting operation. This can include manual control of machine 100 by operator 260 and/or automated control using an automated guidance system, for example.

At block 526, actual yield data is obtained with sensors on the machine during the harvesting operation. For instance, the actual yield data comprises an indication of an instantaneous aggregate yield. This is represented at block 528. For example, with respect to FIG. 5, the instantaneous aggregate yield is detected by sensor 464, and represents crop cut and gathered by header 458 at a prior location of the field. As also noted above, due to time delays in conveyance of the crop material from the individual row units, the aggregation of the crop is from a geo-referenced region in a pattern or shape of a chevron (i.e., material from the central rows is conveyed more quickly to sensor 464 the material from outer row units).

At block 530, the obtained yield data is geo-referenced to the field location. That is, the instantaneous aggregate yield, from block 564, is geo-referenced to the location that machine 100 is at on field 450 when sensor 464 detected that yield.

At block 532, the flow model is applied to generate an actual yield representing the actual yield. This includes, in one example, distributing the actual yield metrics or values to the field (e.g., the actual plant locations from which the plant material was cut by header 458). This is represented at block 533.

Figure 7:
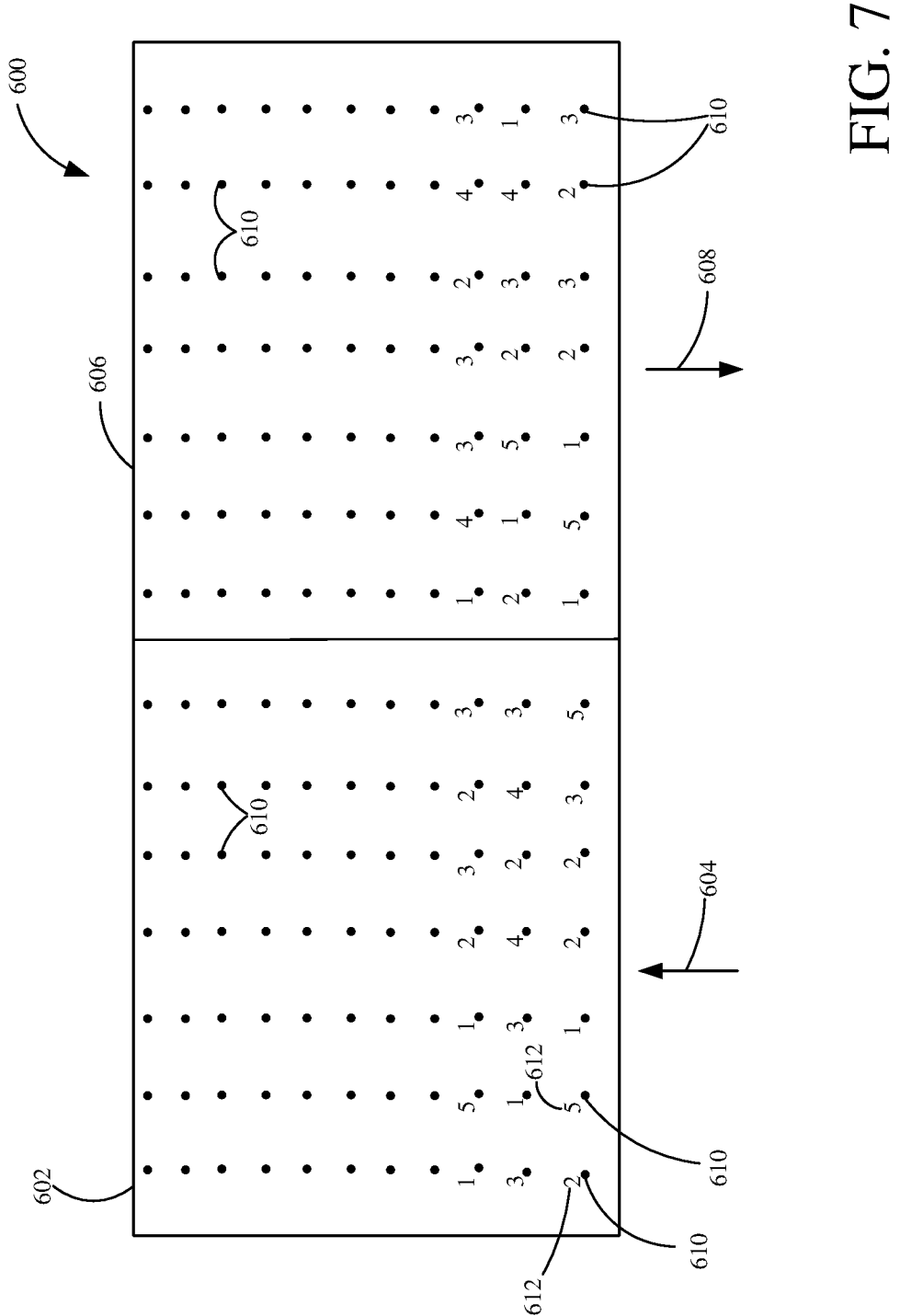
FIG. 7 illustrates one example of a yield map.

FIG. 7 illustrates one example of a yield map 600 generated at block 532. Yield map 600 includes first portion 602 representing an area of the field traversed by machine 100 when traveling in a first direction 604. A second portion 606 of the yield map 600 represents a portion of the field traversed by machine 100 in an opposite direction 608. Illustratively, machine 100 harvested the field area in portion 602 during a first pass and then harvested the field area in portion 606 during a subsequent, adjacent pass over the field.

Yield map 600 includes a plurality of points or nodes 610 with corresponding yield metrics 612. The yield metrics 612 indicate the amount of crop material that has been attributed to the location of the field represented at the corresponding point 610. A higher yield metric indicates a greater amount of crop material. It is noted that the yield metrics illustrated in FIG. 7 are for sake of example only. Any suitable units can be used to represent the yield metrics.

Referring again to FIG. 6, at block 534 a correlation between the actual yield map generated at block 532, and the estimated yield is obtained. In one example, this includes comparing the map yield values at block 536, which can be done in any of a wide variety of ways. For instance, this can include analyzing a plurality of individual locations on the field to determine a variance value (i.e., the variation of the actual yield map and the estimated yield at that point on the field) and then aggregating the variances over the portion of the field (or the entire field). In either case, the correlation at block 534 is used to determine whether a threshold is reached. This includes, in one example, determining whether the correlation (the map/model variance) is within a threshold at block 538 and/or whether a minimum variance has been found at block 540. In either case, operation proceeds to block 542 in which the current yield map is selected as a final map to be output. In one example, this map is identified as an optimized map and can be output at block 432, as shown in FIG. 4. For example, machine 100 (or other systems or machines in architecture 200) is controlled based on the output map. This is represented at block 544. For example, this can include controlling a communication system to communicate the map, at block 546. For instance, the map and/or model parameters can be output to another harvesting machine, to be used in the control of that machine (e.g., generation of yield map data during operation of the other harvesting machine). Also, the map and/or model parameters can be output to remote computing system 256, for storage, or display to remote user 258, or otherwise.

In another example, a data storage system is controlled at block 548 to store the yield map and/or model parameters used in obtaining the yield map. Alternatively, or in addition, operator interface mechanisms 248 can be controlled to render a representation of the yield to operator 260. This is represented at block 550. Also, subsystems of the machine, such as subsystems 246, can be controlled based on the yield map. This is represented at block 552. Of course, the machine 100 or other systems or machines or architecture 200 can be controlled in other ways as well. This is represented at block 554.

If blocks 538 and 540 indicate that the correlation is not within a threshold and that a minimum variance has not been identified, operation proceeds to block 556. Illustratively, blocks 538 and 540 result in the operation continuing, iteratively, until an optimal set of model parameters have been identified that results in a minimum variance, or highest correlation, between the a priori data based estimated yield value and the sensed yield data generated based on in situ data during operation of machine 100.

Figure 8:
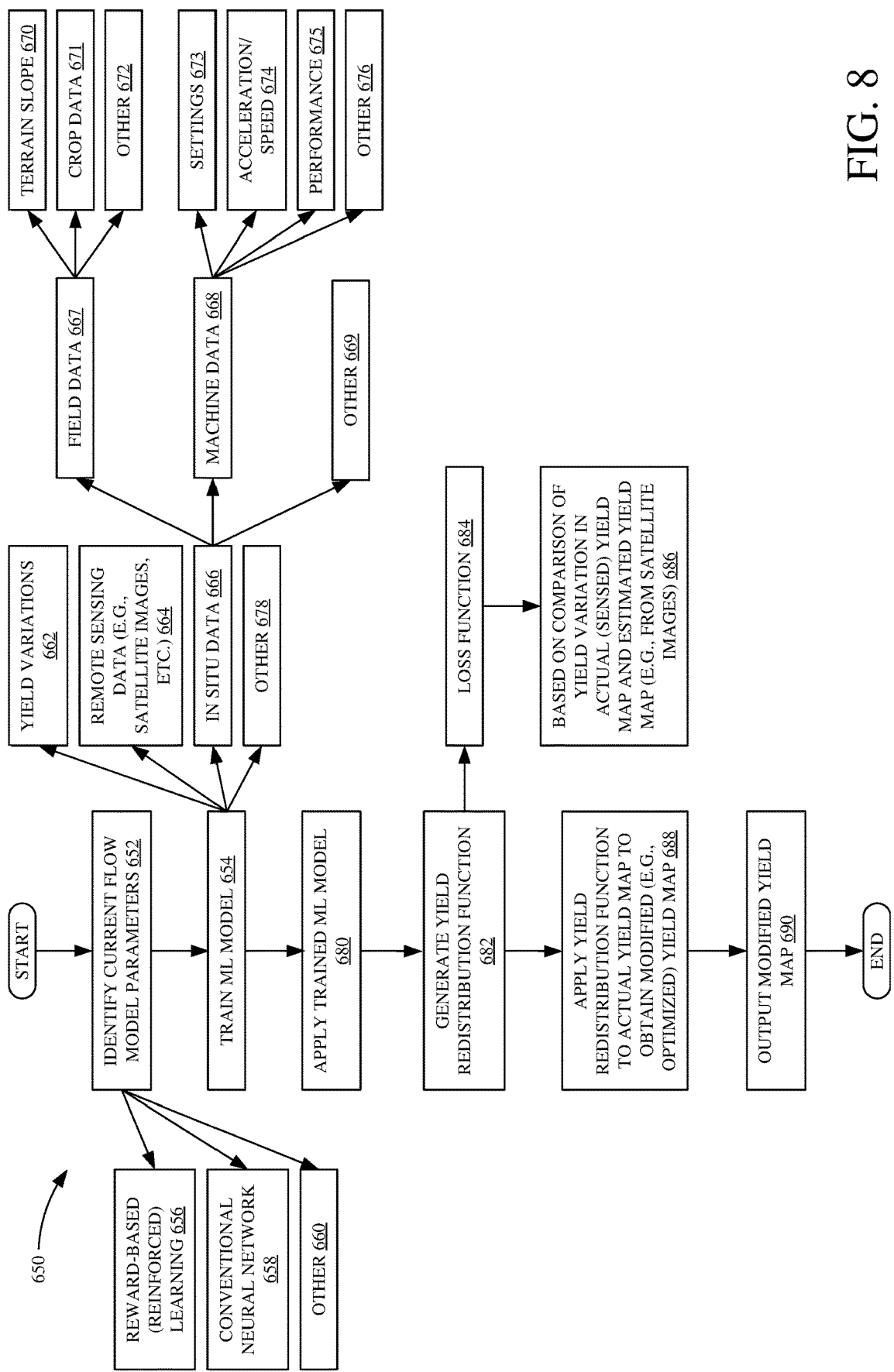
FIG. 8 is a flow diagram illustrating an example operation of a yield map generation system in adjusting parameters of a harvesting system flow model.

FIG. 8 is a flow diagram 650 illustrating an example operation of system 290 in adjusting parameters of the flow model at block 556 and applying of the flow model, with the adjusted parameters, to identify modified parameters that result in a threshold correlation between the detected yield map and the estimated yield map. For sake of illustration, but not by limitation, FIG. 8 will be described in the context of machine learning model parameter adjustment by system 406.

At block 652, the current flow model parameters are identified. Again, as noted above, the model parameters represent delays in harvesting system 285, which can vary based on changes to the machine operation, such as changes to the tilt or pose of the machine, the amount of material entering the machine, moisture of the material entering the machine, the plant variety, random influences on harvesting system 285, etc.

At block 654, the machine learning model is trained to obtain adjusted parameters. As noted above, the machine learning model can use any of a wide variety of different types of machine learning algorithms. For example, a reward-based or reinforced learning algorithm can be utilized. This is represented at block 656. Alternatively, or in addition, a convolutional neural network can be utilized. This is represented at block 658. Of course, other types of machine learning can be utilized as well. This is represented at block 660.

The machine learning model can be trained based on any of a wide variety of sensed inputs. For example, the machine learning model can be trained based on yield variations in the yield maps. This is represented at block 662. Also, the machine learning model can be trained based on remote sensing data from remote sensing systems 208. This is represented at block 664. For instance, satellite images, vegetative index data, etc., can be utilized as inputs to model parameter adjusting logic 422. Also, in situ data can be utilized. This is represented at block 666. The in situ data can represent field data 667, machine data 668 and can include other types of data 669. Field data 667 can indicate field characteristics, such as the terrain slope 670, crop data (variety, moisture, maturity, etc.) 671, or other types of field data 672. Machine data 668 can include data indicative of the settings of machine 100 (this is represented at block 673), the acceleration or speed of machine 100 (represented at block 674), performance of machine 100 (represented at block 675) and can include other types of machine data 676. It is also noted that in situ data 666 can include other data 669 as well.

For sake of illustration, but not by limitation, the machine learning model can be trained to adjust parameters based on inputs representing yield, machine pitch, crop moisture, threshing system variables, etc. Additionally, imagery can be utilized. The model can be trained in other ways as well. This is represented at block 678.

At block 680, the machine learning model is applied to generate a yield redistribution function at block 682. The yield redistribution function defines redistribution of yield values in the yield map that result in a higher correlation between the yield map and the estimated yield. For instance, this can include use of a loss function at block 684. The loss function can be based on a comparison of the yield variation in the actual, sensed yield map and the estimated yield map, estimated based on remote sensing data such as imagery from a satellite system. This is represented at block 686.

At block 688, the yield redistribution function is applied to the yield map to obtain a modified yield map. At block 690, the modified yield map is output, for example for use in control of machine 100, as described at block 582 in FIG. 6.

Figure 9:
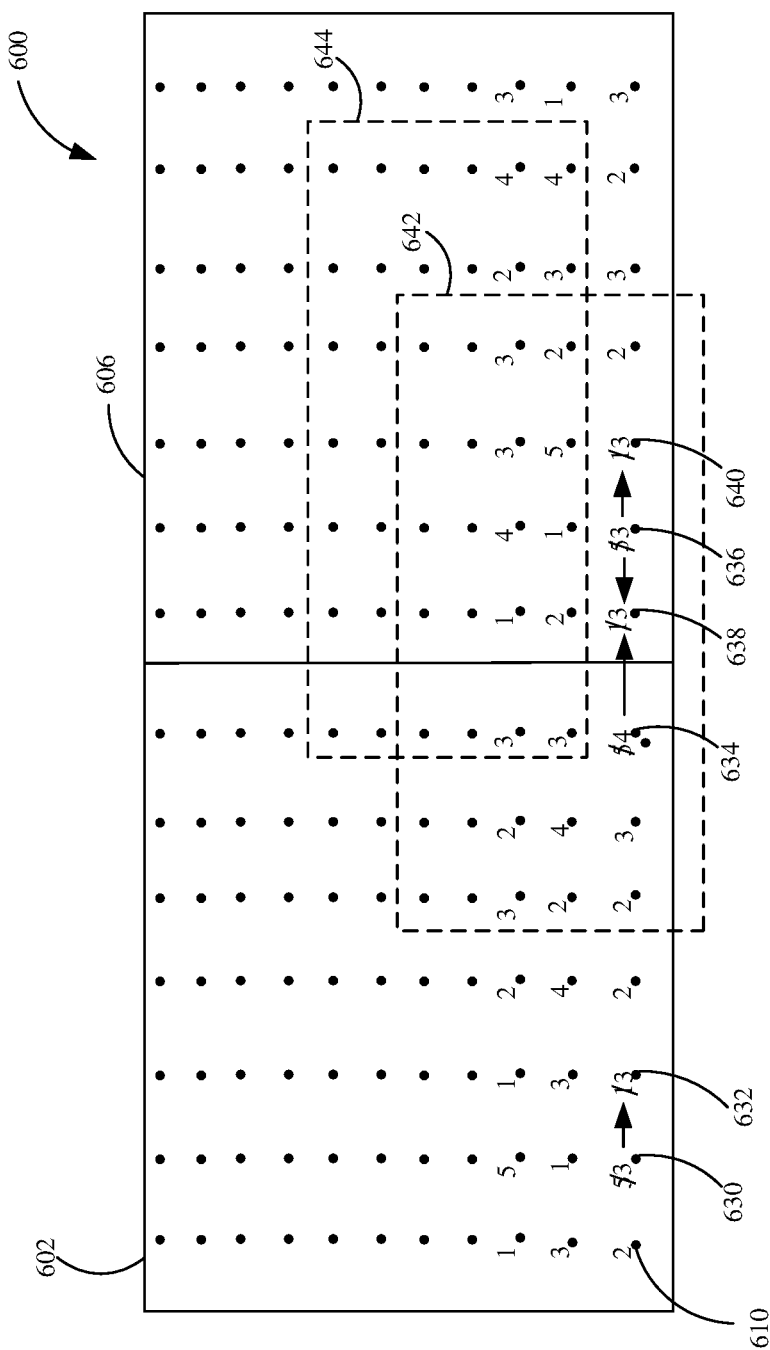
FIG. 9 illustrates one example of application of a yield redistribution function to a yield map.

FIG. 9 illustrates one example of application of a yield redistribution function at block 688. As shown in FIG. 9, which illustrates yield map 600 shown in FIG. 7, yield values 630 and 632 have been modified by redistributing a portion of value 632 to the field location represented by value 632. Similarly, values 634 and 636 are redistributed to adjacent values 638 and 640.

In one example, system 406 is configured to define windows within which re-distribution of the yield values is constrained. To illustrate, in FIG. 9 a window 642 is defined by system 406. Within window 642, logic 424 analyzes the yield values and applies the redistribution function to redistribute yield values, as described above. However, the definition of window 642 cause the yield value distribution to be constrained within the field area corresponding to window 642. That is, a yield value from inside window 642 cannot be distribution to an area outside window 642, and vice versa. This process can be performed iteratively. That is, system 406 can repeated define windows (some of which can be overlapping, such as window 644), and logic 412 can apply the redistribution within each of those windows.

Figure 10:
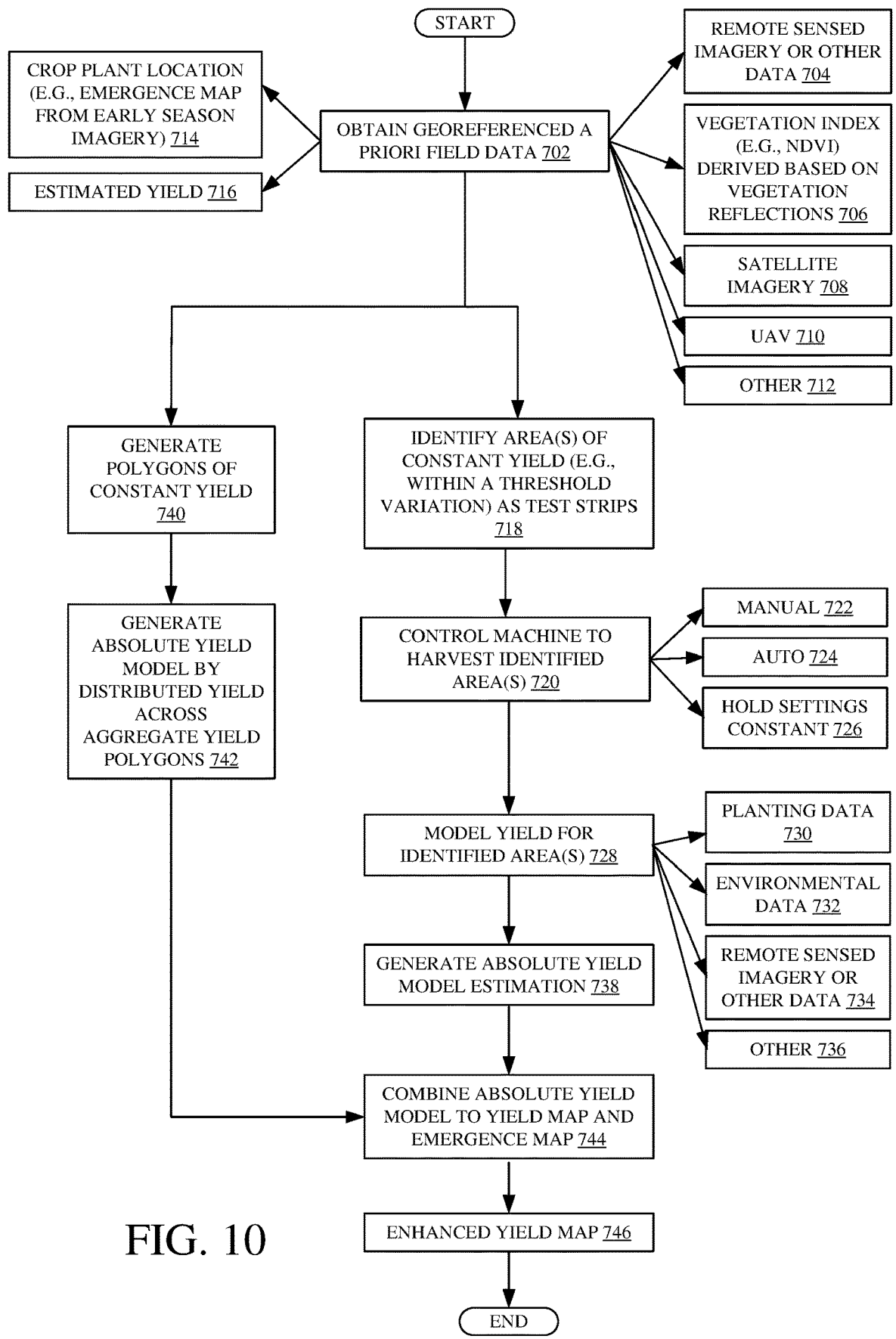
FIG. 10 is a flow diagram illustrating an example operation of a yield map generation system.

FIG. 10 is flow diagram 700 illustrating an example operation of generating a yield map. For sake of illustration, but not by limitation FIG. 10 will described in the context of system 590 generating a yield map representing actual yield. At block 702, geo-referenced a priori field data is obtained. This can include remote sensed imagery or other data, for example obtained from remote sensing system(s) 208. This is represented at block 704. In one example, the field data includes, or represents, a vegetation index (e.g., NDVI) derived based on vegetation reflectance. This is represented at block 706. Also, the field data can be obtained from satellite imagery, block 708, other machines such as an unmanned aerial vehicle (UAV) (block 710), or otherwise (represented at block 712). In one example, the field data represents crop plant location. This is represented at block 714. For instance, an emergence map can be generated from early season imagery. The emergence map identifies locations of individual crop plants on the field. Also, the field data can include an estimated yield, such as an estimated yield map. At block 718, areas of constant yield (e.g., yield within a threshold variation) are identified as test strips. The machine is controlled to harvest these identified areas at block 720. For instance, the machine can be controlled by the operator 260 (This is represented at block 722), and/or automatically (represented at block 724). In one example, settings of the machine are held constant during harvesting over these identified test strips. This is represented at block 726. In one example, these settings include machine speed and settings of harvesting system 285 to maintain a desired throughput.

At block 728, the yield is modeled for the identified areas, based on sensed operation of the machine during the operation at block 720, and based on one or more of planting data 730, environmental data 732, and/or remote sensed imagery or other data 734. Of course, the yield can be modeled in other ways as well. This is represented at block 736. At block 738, an absolute yield model estimation is generated.

In the example of FIG. 10, at block 740, polygons of constant yield (or yield within a threshold variation) are generated based on the a priori field data obtained at block 702. An absolute yield model is generated by distributing yield across the aggregate yield polygons generated at block 740. This is represented at block 742.

Ay block 744, the yield modeled for the test strips is combined with the yield distributed across the polygons of constant yield and the emergence map, to generate an enhanced yield map at block 746.

Accordingly, after the system parameters have been derived, a series of remote sensed vegetative reflectance (or other remote sensed data) is used to reallocate the measured yield back to the original plant locations. The emergence pattern can be used as a base line for where the actual plants are located. The chevron that described where the measured yield is obtained from, along with higher resolution remote sensed imagery can be combined and used to obtain an absolute yield traced back to the original plant location.

It can thus be seen that the present description provides a number of technical advantages. For example, a yield map generation system generates yield maps with enhanced yield map estimation by using machine learning for variable delays in the harvesting machine. The system utilizes machine learning to find a set of model parameters that reflect the instantaneous delays of the machine during the harvesting operation, and can account for changes during operation using sensed data. This not only improves the yield map, but it facilitates improve operations of the harvesting machine and/or other machines/systems that utilize the yield map for controlled operations.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
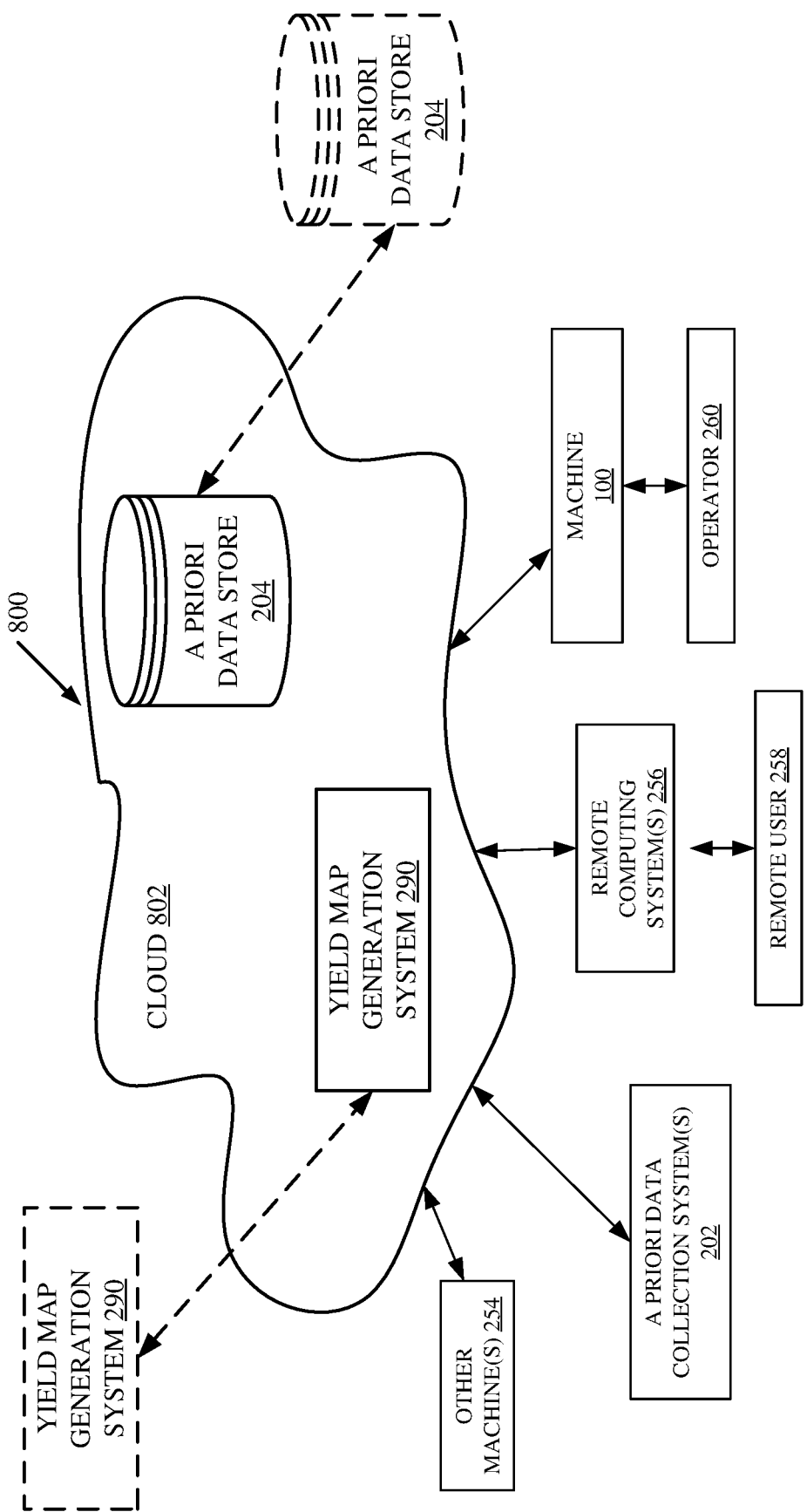
FIG. 11 is a block diagram showing one example of the architecture illustrated in FIG. 2, deployed in a remote server architecture.

FIG. 11 is a block diagram of machine 100, shown in FIG. 2, except that it communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIG. 2 and they are similarly numbered. FIG. 11 specifically shows that yield map generation system 290 and a priori data store 204 can be located at a remote server location 502. Therefore, machine 100 accesses those systems through remote server location 802.

FIG. 11 also depicts another example of a remote server architecture. FIG. 11 shows that it is also contemplated that some elements of FIG. 2 are disposed at remote server location 802 while others are not. By way of example, one or more of system 290 and data store 204 can be disposed at a location separate from location 802, and accessed through the remote server at location 802. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine until the machine enters a covered location. The machine, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
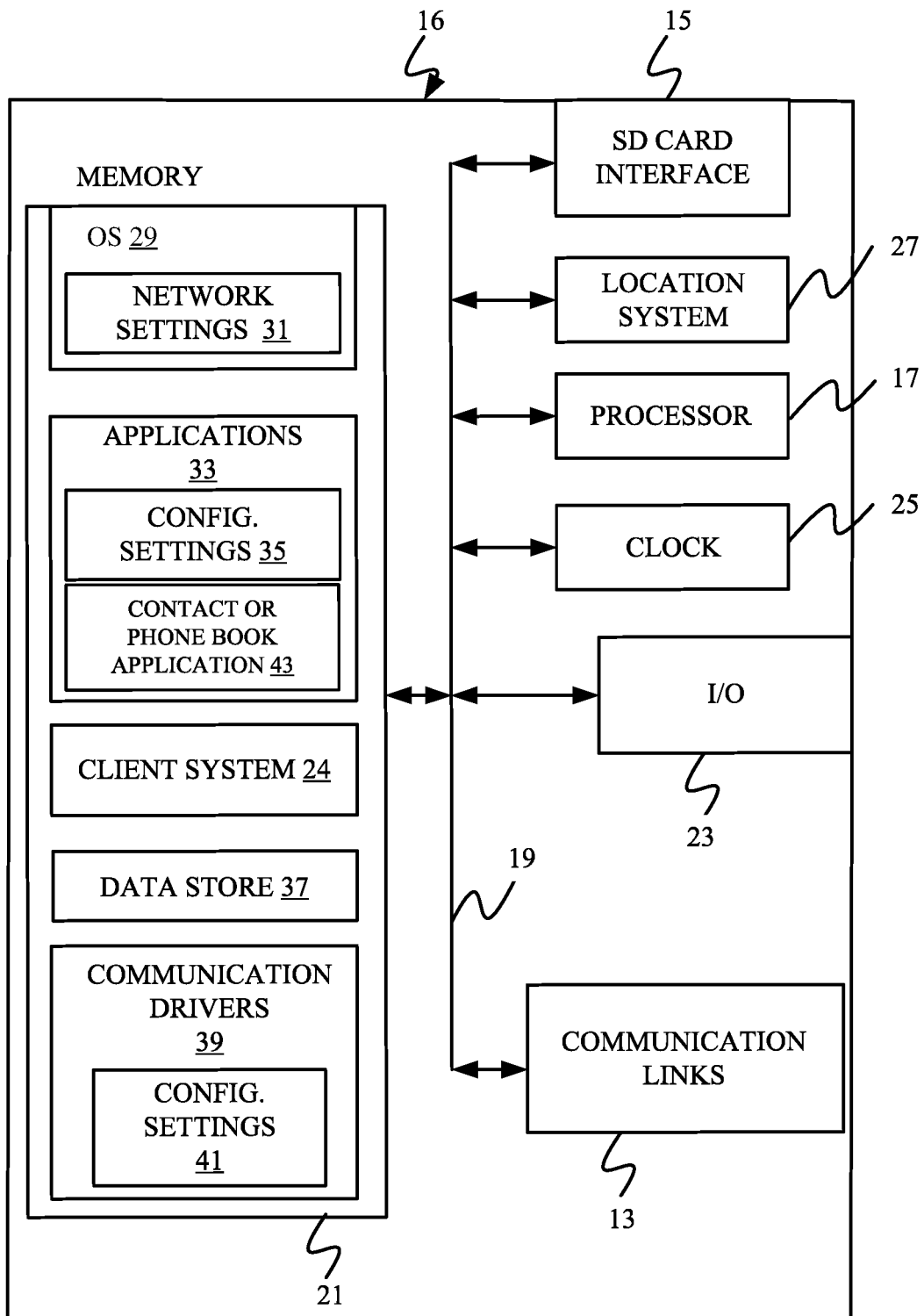
FIGS. 12-14 show examples of mobile devices that can be used in the architectures shown in the previous figures.
Figure 13:
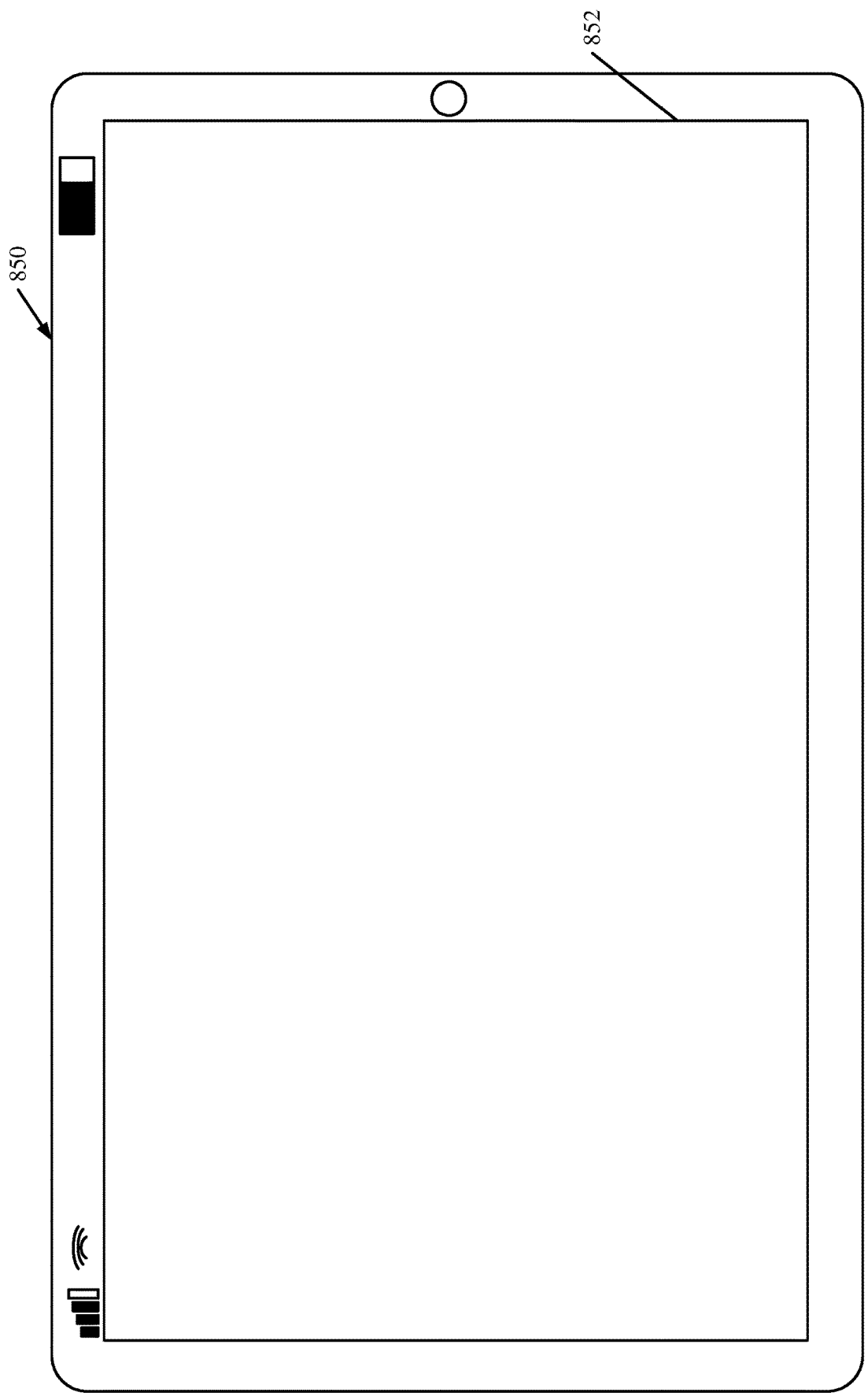
Figure 14:
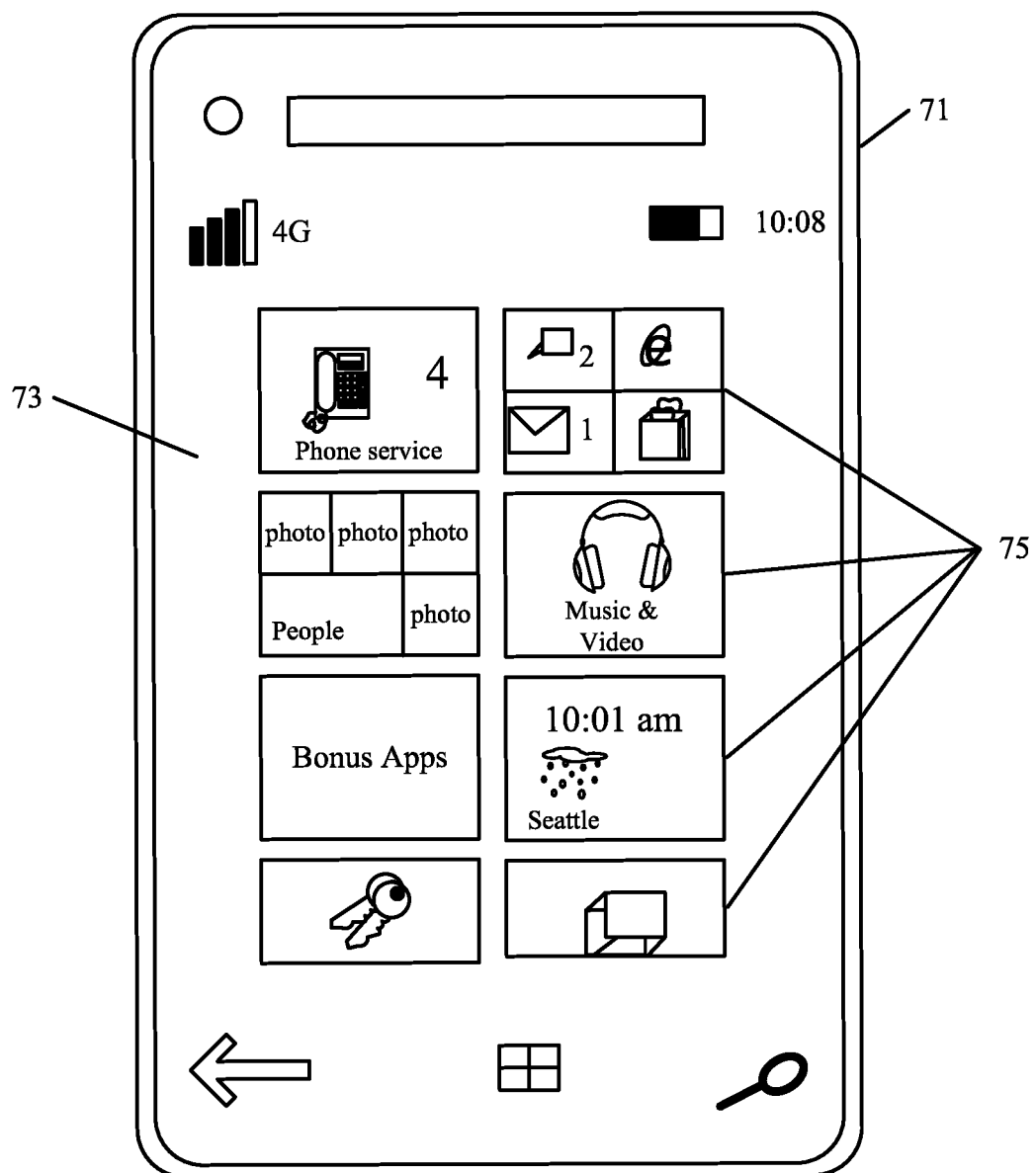

FIG. 12 is a simplified block diagram of one illustrative example of a handheld or mobile computing device that can be used as a user's or client's hand-held device 16, in which the present system (or parts of it) can be deployed. For instance, a mobile device can be deployed in the operator compartment of machine 100 for use in generating, processing, or displaying the stool width and position data. FIGS. 13-14 are examples of handheld or mobile devices.

FIG. 12 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 850. In FIG. 13, computer 850 is shown with user interface display screen 852. Screen 852 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
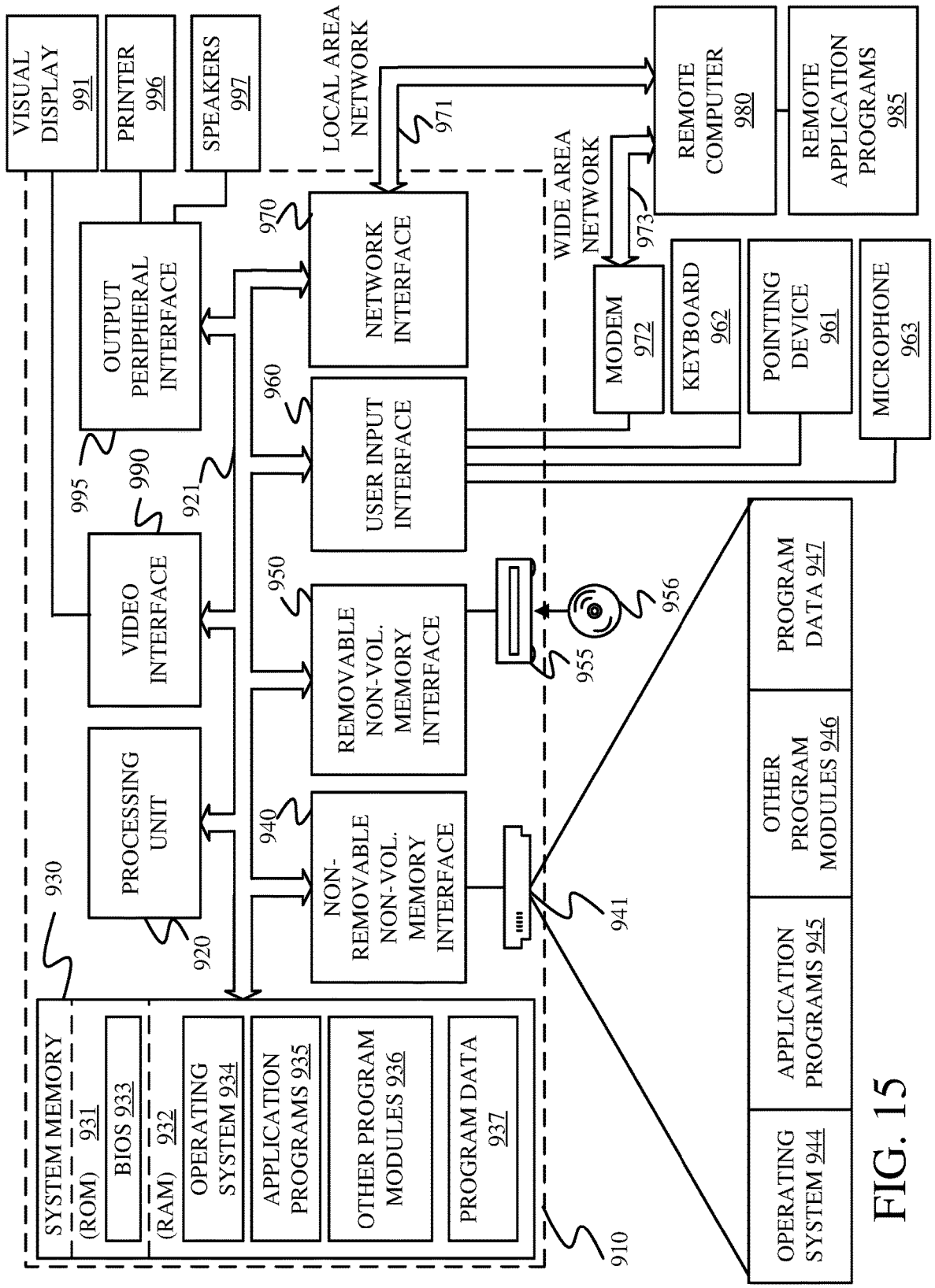
FIG. 15 is a block diagram showing one example of a computing environment that can be used in the architectures shown in the previous figures.

FIG. 15 is one example of a computing environment in which elements of FIG. 2, or parts of it, (for example) can be deployed. With reference to FIG. 15, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 15.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 15 illustrates operating system 934, application programs 935, other program modules 936, and program data 937.

The computer 910 may also include other removable/non-removable volatile/nonvolatile computer storage media. By way of example only, FIG. 15 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 910. In FIG. 15, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 15 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a computer-implemented method comprising:
  obtaining field data for a field that was generated prior to an agricultural harvesting machine operating on the field, the field data representing an estimated yield;
  obtaining yield data, that is georeferenced to the field, based on a signal from a yield sensor on the agricultural harvesting machine;
  applying a flow model to the yield data to generate a yield map, the flow model having a set of parameters that models material flow through a harvesting system of the agricultural harvesting machine;
  obtaining an adjusted set of parameters based on a correlation between the yield map and the estimated yield;
  modifying the yield map based on the adjusted set of parameters; and generating a control signal based on the modified yield map.

Example 2 is the computer-implemented method of any or all previous examples, wherein the field data comprises an estimated yield map of the field.

Example 3 is the computer-implemented method of any or all previous examples, and further comprising determining the correlation based on a comparison of the generate yield map to the estimated yield map.

Example 4 is the computer-implemented method of any or all previous examples, wherein the field data is generated by a remote sensing system.

Example 5 is the computer-implemented method of any or all previous examples, wherein the field data comprises normalized difference vegetation index (NDVI) data.

Example 6 is the computer-implemented method of any or all previous examples, wherein the field data comprises data representing satellite images of the field.

Example 7 is the computer-implemented method of any or all previous examples, wherein the set of parameters represent lateral and traverse delays in the harvesting system.

Example 8 is the computer-implemented method of any or all previous examples, and further comprising obtaining a set of parameters that results in a variance between the yield map and the estimated yield that is below a threshold.

Example 9 is the computer-implemented method of any or all previous examples, and further comprising:
  obtaining the adjusted set of parameters based in situ field data generated by one or more sensors on the agricultural harvesting machine.

Example 10 is the computer-implemented method of any or all previous examples, wherein the in situ data comprises one or more of:
  the obtained yield data,
  machine tilt data indicative of a tilt of the agricultural harvesting machine,
  moisture data indicative of moisture content of the material processed through the harvesting system, and
  settings data indicative of control settings of the harvesting system.

Example 11 is the computer-implemented method of any or all previous examples, wherein modifying the yield map comprises:
  generating a redistribution function represented by the adjusted set of parameters; and
  redistributing yield values on the yield map based on the redistribution function.

Example 12 is the computer-implemented method of any or all previous examples, wherein the flow model comprises a machine learning model that is trained with inputs received from one or more sensors on the machine, and the redistribution function is based on a loss function of the machine learning model.

Example 13 is an agricultural harvesting machine comprising:
  a harvesting system configured to harvest crop from a field;
  a yield map generation system configured to:
    obtain field data for a field that was generated prior to the agricultural harvesting machine operating on the field, the field data representing an estimated yield;

obtain yield data, that is georeferenced to the field, based on a signal from a yield sensor on the agricultural harvesting machine;
apply a flow model to the yield data to generate a yield map, the flow model having a set of parameters that models material flow through the harvesting system;
obtain an adjusted set of parameters based on a correlation between the yield map and the estimated yield; and
modify the yield map based on the adjusted set of parameters; and
control logic configured to generate a control signal based on the modified yield map.

Example 14 is the agricultural harvesting machine of any or all previous examples, wherein the field data comprises an estimated yield map of the field, and the yield map generation system is configured to:
determine the correlation based on a comparison of the generate yield map to the estimated yield map.

Example 15 is the agricultural harvesting machine of any or all previous examples, wherein the set of parameters represent lateral and traverse delays in the harvesting system.

Example 16 is the agricultural harvesting machine of any or all previous examples, wherein the yield map generation system is configured to obtain a set of parameters that results in a variance between the yield map and the estimated yield that is below a threshold.

Example 17 is the agricultural harvesting machine of any or all previous examples, wherein the yield map generation system is configured to modify the yield map by generating a redistribution function represented by the adjusted set of parameters, and redistributing yield values on the yield map based on the redistribution function.

Example 18 is a control system for an agricultural harvesting machine, the control system comprising:
yield estimation logic configured to:
obtain field data for a field that was generated prior to the agricultural harvesting machine operating on the field, the field data representing an estimated yield; and
obtain yield data, that is georeferenced to the field, based on a signal from a yield sensor on the agricultural harvesting machine;
yield map generator logic configured to:
apply a flow model to the yield data to generate a yield map, the flow model having a set of parameters that models material flow through a harvesting system of the agricultural harvesting machine;
obtain an adjusted set of parameters based on a correlation between the yield map and the estimated yield; and
modify the yield map based on the adjusted set of parameters; and control logic configured to generate a control signal based on the modified yield map.

Example 19 is the control system of any or all previous examples, wherein the field data comprises an estimated yield map of the field, the set of parameters represent lateral and traverse delays in the harvesting system, and the yield map generator logic is configured to determine the correlation based on a comparison of the generate yield map to the estimated yield map.

Example 20 is the control system of any or all previous examples, wherein the yield map generator logic is configured to modify the yield map by generating a redistribution function represented by the adjusted set of parameters, and redistributing yield values on the yield map based on the redistribution function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
obtaining field data for a field that was generated prior to an agricultural harvesting machine operating on the field, the field data representing an estimated yield;
obtaining yield data, that is georeferenced to the field, based on a signal from a yield sensor on the agricultural harvesting machine;
applying a flow model to the yield data to generate a yield map, the flow model having a set of parameters that models material flow through a harvesting system of the agricultural harvesting machine, wherein the flow model comprises a machine learning model that is trained with inputs received from one or more sensors on the machine;
obtaining an adjusted set of parameters based on a correlation between the yield map and the estimated yield;
modifying the yield map to generate a modified yield map, wherein modifying the yield map comprises:
generating a redistribution function represented by the adjusted set of parameters, wherein the redistribution function is based on a loss function of the machine learning model; and
redistributing yield values on the yield map based on the redistribution function; and
generating a control signal based on the modified yield map.

2. The computer-implemented method of claim 1, wherein the field data comprises an estimated yield map of the field.

3. The computer-implemented method of claim 2, and further comprising determining the correlation based on a comparison of the generate yield map to the estimated yield map.

4. The computer-implemented method of claim 1, wherein the field data is generated by a remote sensing system.

5. The computer-implemented method of claim 1, wherein the field data comprises normalized difference vegetation index (NDVI) data.

6. The computer-implemented method of claim 1, wherein the field data comprises data representing satellite images of the field.

7. The computer-implemented method of claim 1, wherein the set of parameters represent lateral and traverse delays in the harvesting system.

8. The computer-implemented method of claim 7, and further comprising obtaining a set of parameters that results in a variance between the yield map and the estimated yield that is below a threshold.

9. The computer-implemented method of claim 7, and further comprising:
obtaining the adjusted set of parameters based on in situ field data generated by one or more sensors on the agricultural harvesting machine.

10. The computer-implemented method of claim 9, wherein the in situ field data comprises one or more of:

the obtained yield data,
machine tilt data indicative of a tilt of the agricultural harvesting machine,
moisture data indicative of moisture content of the material processed through the harvesting system, or
settings data indicative of control settings of the harvesting system.

11. An agricultural harvesting machine comprising:
a harvesting system configured to harvest crop from a field;
a yield map generation system configured to:
  obtain field data for a field that was generated prior to the agricultural harvesting machine operating on the field, the field data representing an estimated yield;
  obtain yield data, that is georeferenced to the field, based on a signal from a yield sensor on the agricultural harvesting machine;
  apply a flow model to the yield data to generate a yield map, the flow model having a set of parameters that results in a variance between the yield map and the estimated yield that is below a threshold, wherein the set of parameters that models material flow through the harvesting system;
  obtain an adjusted set of parameters based on a correlation between the yield map and the estimated yield; and
  modify the yield map to generate a modified yield map based on the adjusted set of parameters; and
control logic configured to generate a control signal based on the modified yield map.

12. The agricultural harvesting machine of claim 11, wherein the field data comprises an estimated yield map of the field, and the yield map generation system is configured to:
  determine the correlation based on a comparison of the generate yield map to the estimated yield map.

13. The agricultural harvesting machine of claim 11, wherein the set of parameters represent lateral and traverse delays in the harvesting system.

14. The agricultural harvesting machine of claim 11, wherein the yield map generation system is configured to modify the yield map by generating a redistribution function represented by the adjusted set of parameters, and redistributing yield values on the yield map based on the redistribution function.

15. A control system for an agricultural harvesting machine, the control system comprising:
yield estimation logic configured to:
  obtain field data for a field that was generated prior to the agricultural harvesting machine operating on the field, the field data representing an estimated yield; and
  obtain yield data, that is georeferenced to the field, based on a signal from a yield sensor on the agricultural harvesting machine;
yield map generator logic configured to:
  apply a flow model to the yield data to generate a yield map, the flow model having a set of parameters that models material flow through a harvesting system of the agricultural harvesting machine, wherein the set of parameters represent lateral and traverse delays in the harvesting system;
  obtain an adjusted set of parameters based on a correlation between the yield map and the estimated yield; and
  modify the yield map to generate a modified yield map based on the adjusted set of parameters; and
control logic configured to generate a control signal based on the modified yield map.

16. The control system of claim 15, wherein the field data comprises an estimated yield map of the field, and the yield map generator logic is configured to determine the correlation based on a comparison of the generate yield map to the estimated yield map.

17. The control system of claim 15, wherein the yield map generator logic is configured to modify the yield map by generating a redistribution function represented by the adjusted set of parameters, and redistributing yield values on the yield map based on the redistribution function.

* * * * *